(12) United States Patent
Tsiaflakis et al.

(10) Patent No.: US 10,998,932 B2
(45) Date of Patent: May 4, 2021

(54) USE OF VECTORING AND TIME- AND/OR FREQUENCY—DIVISION MULTIPLE ACCESS IN A MULTI-USER CONNECTION

(71) Applicant: Nokia Solutions and Networks OY, Espoo (FI)

(72) Inventors: Paschalis Tsiaflakis, Schriek (BE); Carl Nuzman, Union, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 207 days.

(21) Appl. No.: 16/246,989

(22) Filed: Jan. 14, 2019

(65) Prior Publication Data
US 2020/0228161 A1    Jul. 16, 2020

(51) Int. Cl.
| | | |
|---|---|---|
| *G06F 21/00* | (2013.01) | |
| *H04B 3/32* | (2006.01) | |
| *H04J 1/12* | (2006.01) | |
| *H04J 3/10* | (2006.01) | |
| *H04J 4/00* | (2006.01) | |

(52) U.S. Cl.
CPC ............... *H04B 3/32* (2013.01); *H04J 1/12* (2013.01); *H04J 3/10* (2013.01); *H04J 4/00* (2013.01)

(58) Field of Classification Search
CPC ....... H04B 3/32; H04J 1/12; H04J 4/00; H04J 3/10
USPC ..................... 379/406.06, 414–417
See application file for complete search history.

(56) References Cited

U.S. PATENT DOCUMENTS

2013/0235915 A1    9/2013    Wang et al.

FOREIGN PATENT DOCUMENTS

EP    2852067 A1    9/2013

OTHER PUBLICATIONS

Extended European Search Report from corresponding European application No. 20150145.9; dated Apr. 2, 2020 (9 pages).
Sadeghi, M., et al. "Reducing the computational complexity of multicasting in large-scale antenna systems." IEEE Transactions on Wireless Communications 16.5 (2017): 2963-2975.
Stojkovič, N. "ADSL analogno sučelje." Automatika: časopis za automatiku, mjerenje, elektroniku, računarstvo i komunikacije 47.1-2 (2006): 59-67.

(Continued)

*Primary Examiner* — Md S Elahee
(74) *Attorney, Agent, or Firm* — Mendelsohn Dunleavy, P.C.; Yuri Gruzdkov

(57) ABSTRACT

A multi-line digital transceiver configured to use digital signal vectoring in a manner that causes effects of crosstalk between distinct groups of subscriber lines to be effectively mitigated, without directly attempting to mitigate effects of crosstalk within any one of those distinct groups. In an example embodiment, effects of crosstalk within each of the distinct groups can be mitigated indirectly using an appropriate T/FDMA schedule, according to which, during a given symbol period, a given resource block of any of the distinct groups can carry data corresponding to a single respective subscriber. A precoder (postcoder) matrix for the digital signal vectoring can be generated using block-diagonalization techniques appropriately constrained, e.g., using the groups' definitions, aggregate-transmit-power restrictions, etc. In various embodiments, the disclosed digital signal vectoring can be used on the downlink or on the uplink, or both.

18 Claims, 12 Drawing Sheets

(56) References Cited

OTHER PUBLICATIONS

Strobel, R., et al. "Discontinuous operation for precoded G. fast." 2016 IEEE International Conference on Acoustics, Speech and Signal Processing (ICASSP). IEEE, 2016.

Swisscom, "Swisscom requirements for G.mgfast Point-to-Multipoint (P2MP) operation", T17-SGI5RGM-Q4-180827-C-0003, Berlin, Germany, Aug. 2018.

Intel, "G.mgfast: On the bandwidth redistribution in P2MP deployments". T17-SG15RGM-Q4-180827-C-0042, Berlin, Germany, Aug. 2018.

"Series G: Transmission Systems and Media, Digital Systems and Networks, Fast access to subscriber terminals (G.fast)—Physical layer specification;" ITU-T Recommendation ITU-T G.9701; International Telecommunication Union; Dec. 2014; 324 pages.

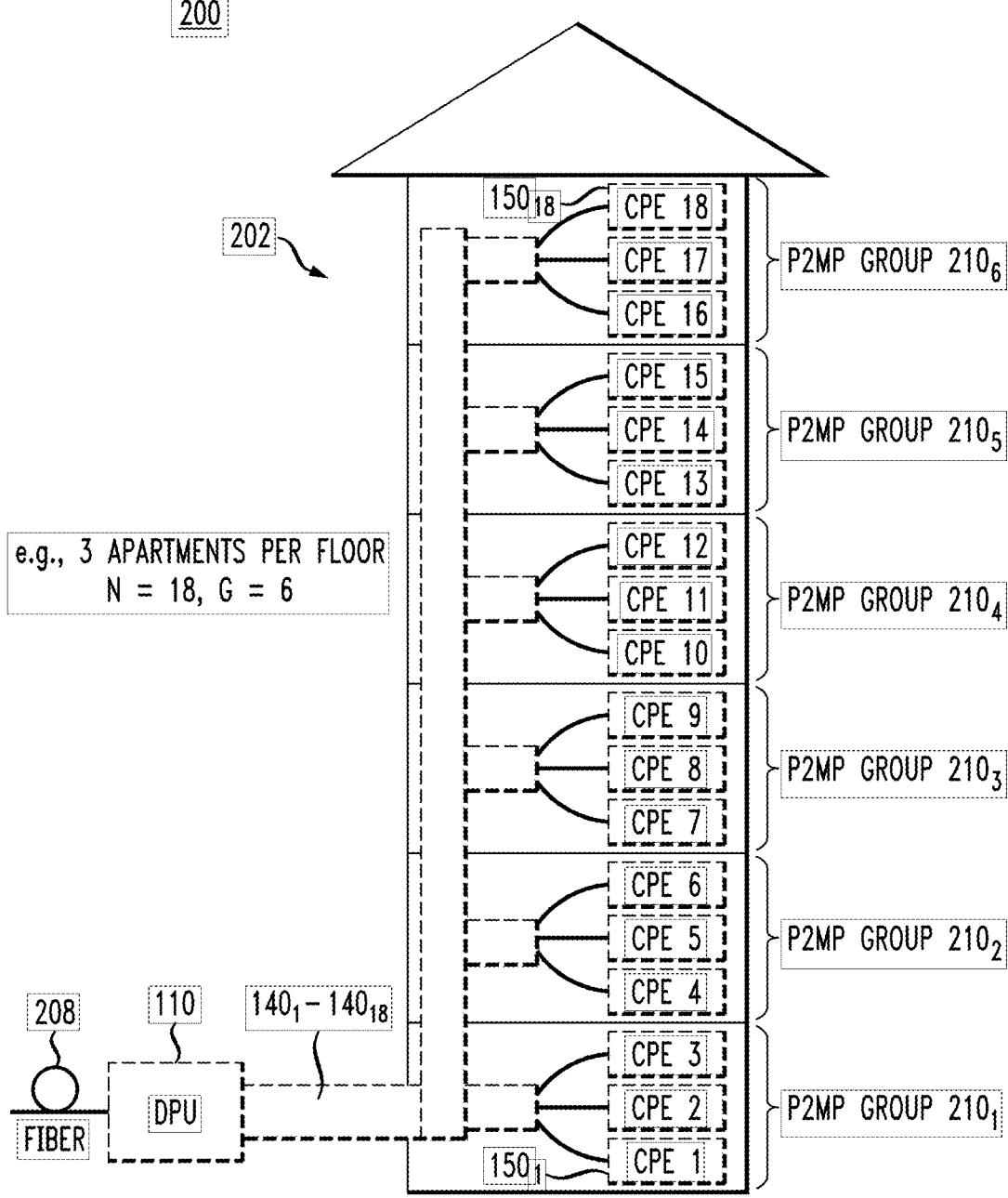

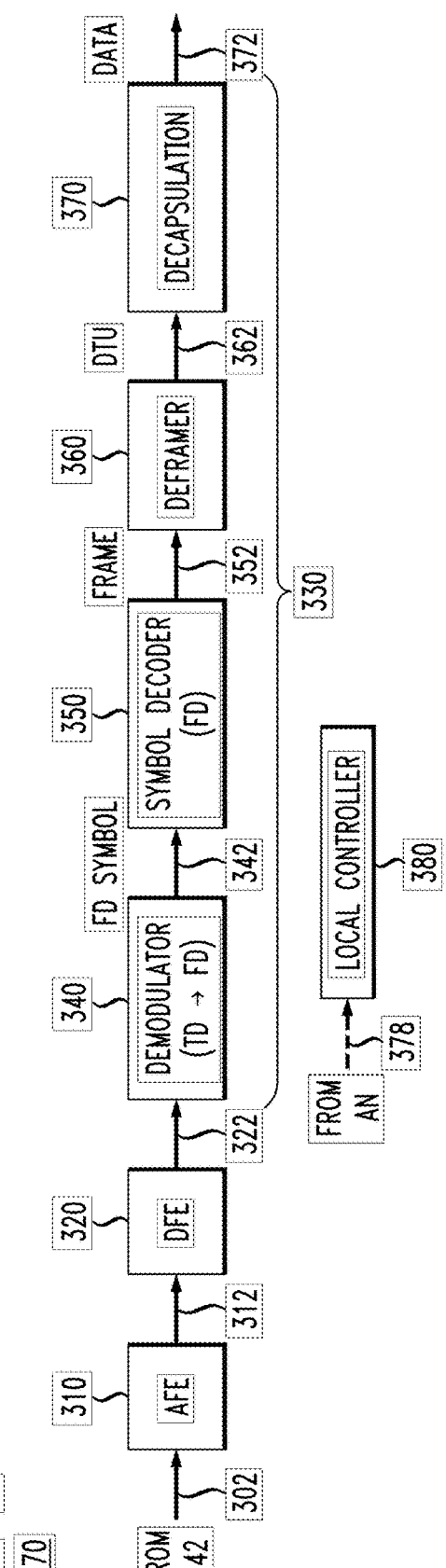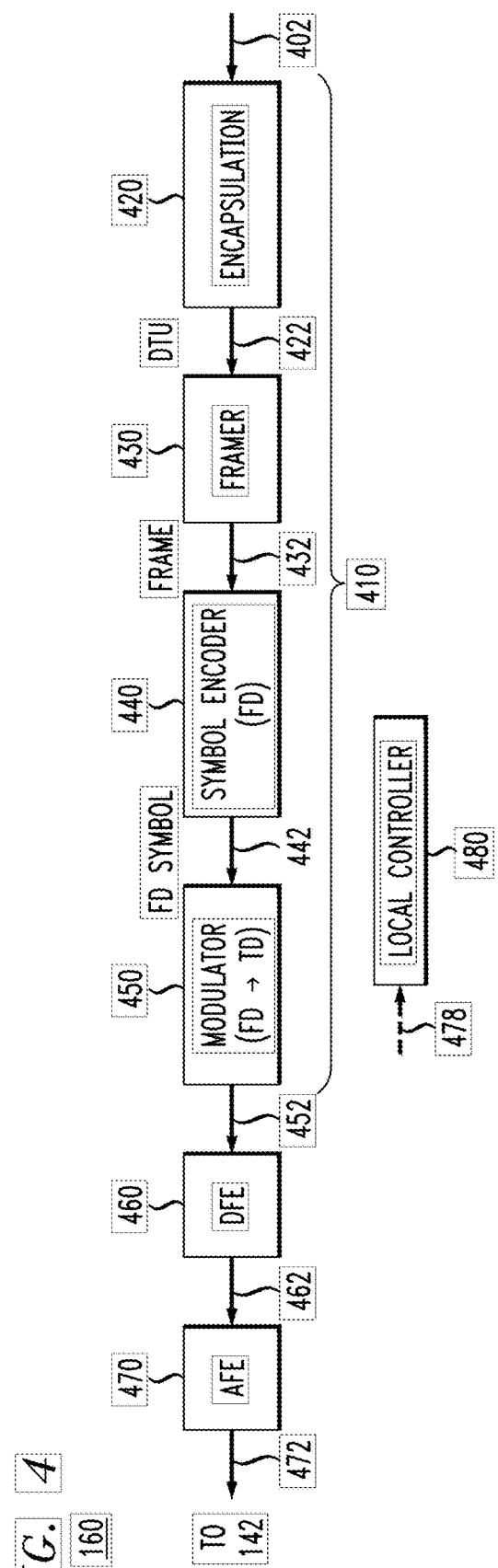

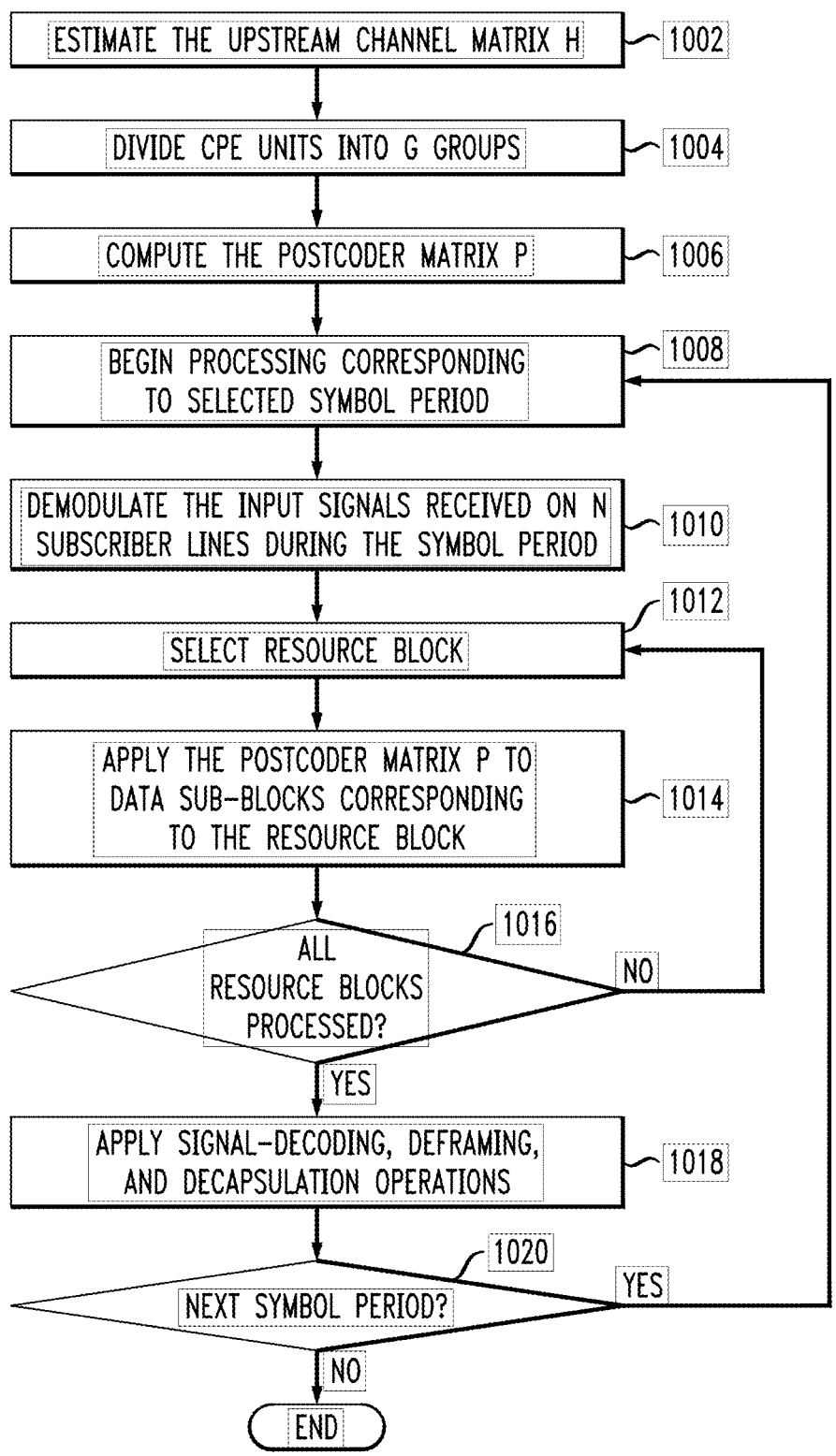

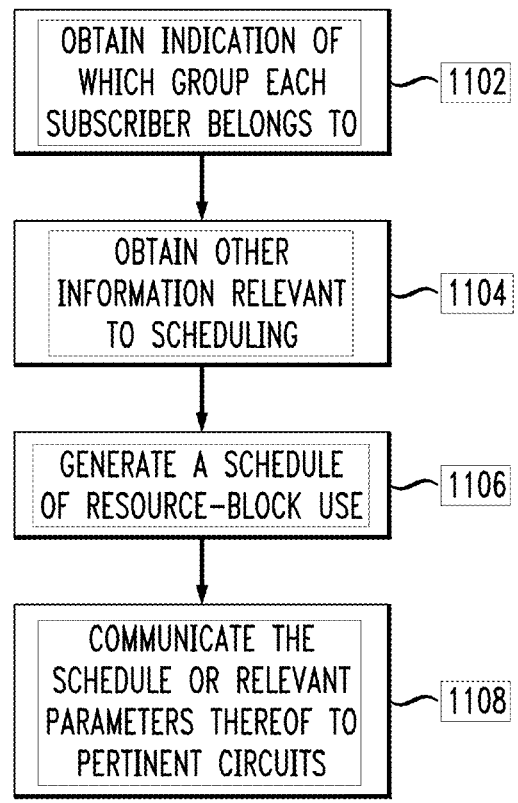

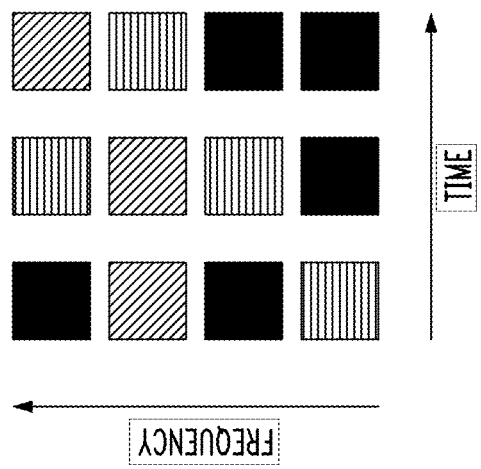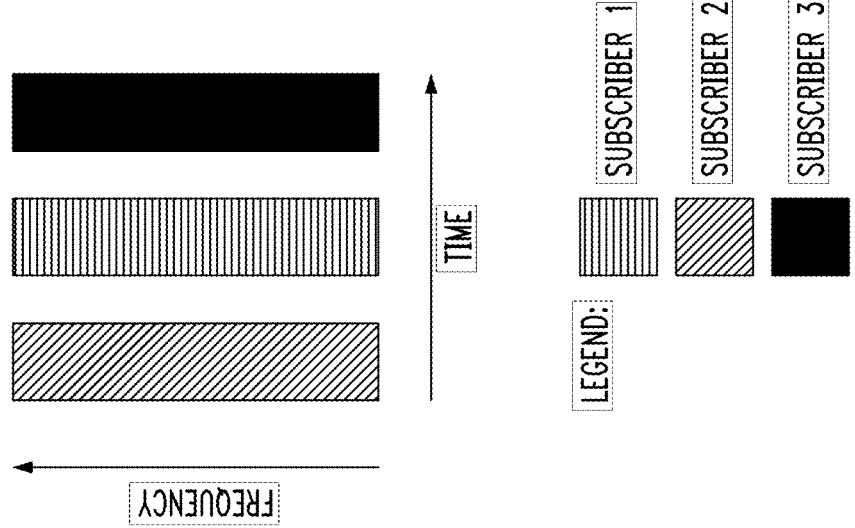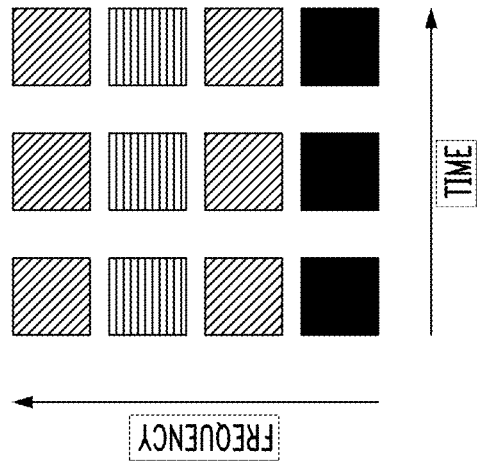

USE OF VECTORING AND TIME- AND/OR FREQUENCY—DIVISION MULTIPLE ACCESS IN A MULTI-USER CONNECTION

BACKGROUND

Field

Various example embodiments relate to communication equipment and, more specifically but not exclusively, to methods and apparatus for transmitting and receiving communication signals using vectoring and time- and/or frequency-division multiple access.

Description of the Related Art

This section introduces aspects that may help facilitate a better understanding of the disclosure. Accordingly, the statements of this section are to be read in this light and are not to be understood as admissions about what is in the prior art or what is not in the prior art.

Frequency-division multiplexing (FDM) is a method of transmitting data on multiple carrier frequencies (or tones) that can be used in wireline, wireless, and optical communication channels. Different variants of FDM are used in various forms of wideband digital communications, digital television, audio broadcasting, digital subscriber line (DSL) or G.fast Internet access, local area networks (LANs), home networks, 4G mobile-access networks, etc. Some variants of FDM, typically collectively referred to as discrete multi-tone (DMT) modulation, are used in wireline communication channels established over, e.g., plain old telephone service (POTS) copper wiring, coaxial cable, and/or power lines. Some FDM schemes use orthogonal frequency-division multiplexing (OFDM).

Frequency-division multiple access (FDMA) is a channel-access technique used in some multiple-access protocols. FDMA permits individual allocation of single or multiple frequency bands to the users such that multiple users can send data through a common channel (e.g., a coaxial cable or wire line).

FDM and FDMA are typically used in different layers of the Open Systems Interconnection (OSI) model and, as such, can be used independently. For example, FDM is typically implemented in the physical layer to transmit multiple relatively low-bandwidth channels via a high-bandwidth channel. In contrast, FDMA is typically implemented in the data link layer to provide shared access to a high-bandwidth channel.

Time-division multiple access (TDMA) is a channel-access method that can be used to facilitate channel sharing. TDMA allows multiple users to share and use the same transmission channel by dividing signals into different time slots. The users transmit in rapid succession, one after the other, each using its own time slot. This allows multiple users to share the same frequency channel while using only a part of its capacity.

SUMMARY OF SOME SPECIFIC EMBODIMENTS

Disclosed herein are various embodiments of a multi-line digital transceiver configured to use digital signal vectoring in a manner that causes effects of crosstalk between distinct groups of subscriber lines to be effectively mitigated, without directly attempting to mitigate effects of crosstalk within any one of those distinct groups. In an example embodiment, effects of crosstalk within each of the distinct groups can be mitigated indirectly using an appropriate T/FDMA schedule, according to which, during a given symbol period, a given resource block of any of the distinct groups can carry data corresponding to a single respective subscriber. A precoder (postcoder) matrix for the digital signal vectoring can be generated using block-diagonalization techniques appropriately constrained, e.g., using the groups' definitions, aggregate-transmit-power restrictions, etc. In various embodiments, the disclosed digital signal vectoring can be used on the downlink or on the uplink, or both.

An important benefit of the disclosed vectoring scheme is that it does not require updates of the precoder (postcoder) matrix when the set of active subscribers changes and/or when FDMA or TDMA allocations within one or more groups change. This property can advantageously be used to support fast FDMA and TDMA dynamics, e.g., on the millisecond time scale, which is not generally supported under conventional vectoring schemes.

According to an example embodiment, provided is an apparatus comprising a data transmitter that comprises an analog front end connectable to proximal ends of a plurality of subscriber lines and a digital signal processor configured to process digital samples corresponding to a plurality of distinct groups of output signals and to drive the analog front end to cause the plurality of distinct groups of output signals to be transmitted on the subscriber lines using frequency-division multiplexing, with each of the distinct groups of the output signals being transmitted on a corresponding distinct group of the subscriber lines, at least one of the distinct groups of the subscriber lines including at least two of the subscriber lines; wherein the digital signal processor comprises a vector processor configured to precode the digital samples in a manner that causes effects of crosstalk between the distinct groups of the subscriber lines to be substantially mitigated at distal ends of the plurality of subscriber lines; and wherein the vector processor is further configured to precode the digital samples in a manner that causes each of the distinct groups of the output signals to convey a different respective data block to the distal ends of the corresponding distinct group of the subscriber lines, said different respective data block being conveyed to each of the distal ends of the corresponding distinct group of the subscriber lines.

According to another example embodiment, provided is an apparatus comprising a data receiver that comprises an analog front end and a digital signal processor configured to process digital samples corresponding to a plurality of input signals received by the analog front end at input ports connectable to proximal ends of a corresponding plurality of subscriber lines, the input signals being received in response to data signals applied to distal ends of the subscriber lines, the data signals having been encoded with data using frequency-division multiplexing; wherein the digital signal processor comprises a vector processor configured to post-code the digital samples in a manner that causes effects of crosstalk between distinct groups of the subscriber lines to be substantially mitigated, at least one of said distinct groups including at least two of the subscriber lines; and wherein the vector processor is further configured to postcode the digital samples in a manner that causes each distinct group of the data signals to convey the data thereof to a different respective data block formed by the vector processor, each of said distinct groups of the data signals being applied to the distal ends of a corresponding one of said distinct groups of the subscriber lines.

BRIEF DESCRIPTION OF THE DRAWINGS

Other aspects, features, and benefits of various disclosed embodiments will become more fully apparent, by way of example, from the following detailed description and the accompanying drawings, in which:

FIG. 2 shows a block diagram of a multi-subscriber connection that can be implemented in the communication system of FIG. 1 according to an embodiment;

FIG. 3 shows a block diagram of a CPE receiver that can be used in the communication system of FIG. 1 according to an embodiment;

FIG. 4 shows a block diagram of a CPE transmitter that can be used in the communication system of FIG. 1 according to an embodiment;

FIG. 10 shows a flowchart of an uplink communication method that can be used in the communication system of FIG. 1 according to an embodiment;

FIG. 11 shows a flowchart of a scheduling method that can be used in the communication system of FIG. 1 according to an embodiment;

FIGS. 12A-12C graphically illustrate resource-block allocation schemes that can be used in various embodiments of the communication system of FIG. 1.

DETAILED DESCRIPTION

The following acronyms/abbreviations are used in the description of various embodiments and/or in the accompanying drawings:

ADC Analog-to-Digital Converter;
AFE Analog Front End;
AN Access Node;
CRC Cyclic Redundancy Check;
CPE Customer Premise Equipment;
DAC Digital-to-Analog Converter;
DFE Digital Front End;
DMT Discrete Multi-Tone;
DMUX Demultiplexer;
DOI Discontinuous Operation Interval;
DPU Distribution Point Unit;
DRA Dynamic Resource Allocation;
DSP Digital Signal Processor;
DSL Digital Subscriber Line;
DTU Data Transfer Unit;
FD Frequency Domain;
FDM Frequency-Division Multiplexing;
FDMA Frequency-Division Multiple Access;
FEC Forward Error Correction;
FTTB Fiber To The Building;
I/O Input/Output;
LAN Local Area Network;
MAC Media Access Control;
MSC Multi-Subscriber Connection;
MUX Multiplexer;
NOI Normal Operation Interval;
OFDM Orthogonal Frequency-Division Multiplexing;
OSI Open Systems Interconnection;
P2MP Point-to-Multi-Point;
POTS Plain Old Telephone Service;
PSD Power Spectral Density;
RF Radio Frequency;
SNR Signal to Noise Ratio;
TD Time Domain;
TDMA Time-Division Multiple Access; and
T/FDMA Time/Frequency-Division Multiple Access.

As used herein, the term Time/Frequency-Division Multiple Access (or T/FDMA) should be construed to cover TDMA, FDMA, and various combinations of TDMA and FDMA. Illustrative examples of T/FDMA that can be used in at least some embodiments are described in more detail below in reference to FIGS. 12A-12C.

As used herein, the term "resource block" refers to a group of tones in a symbol or one or more frequency ranges in a time slot. A resource block can be assigned to a user for downlink and/or uplink communications. For an example channel, a resource block may have twelve subcarriers, but other numbers are also possible.

Figure 1:
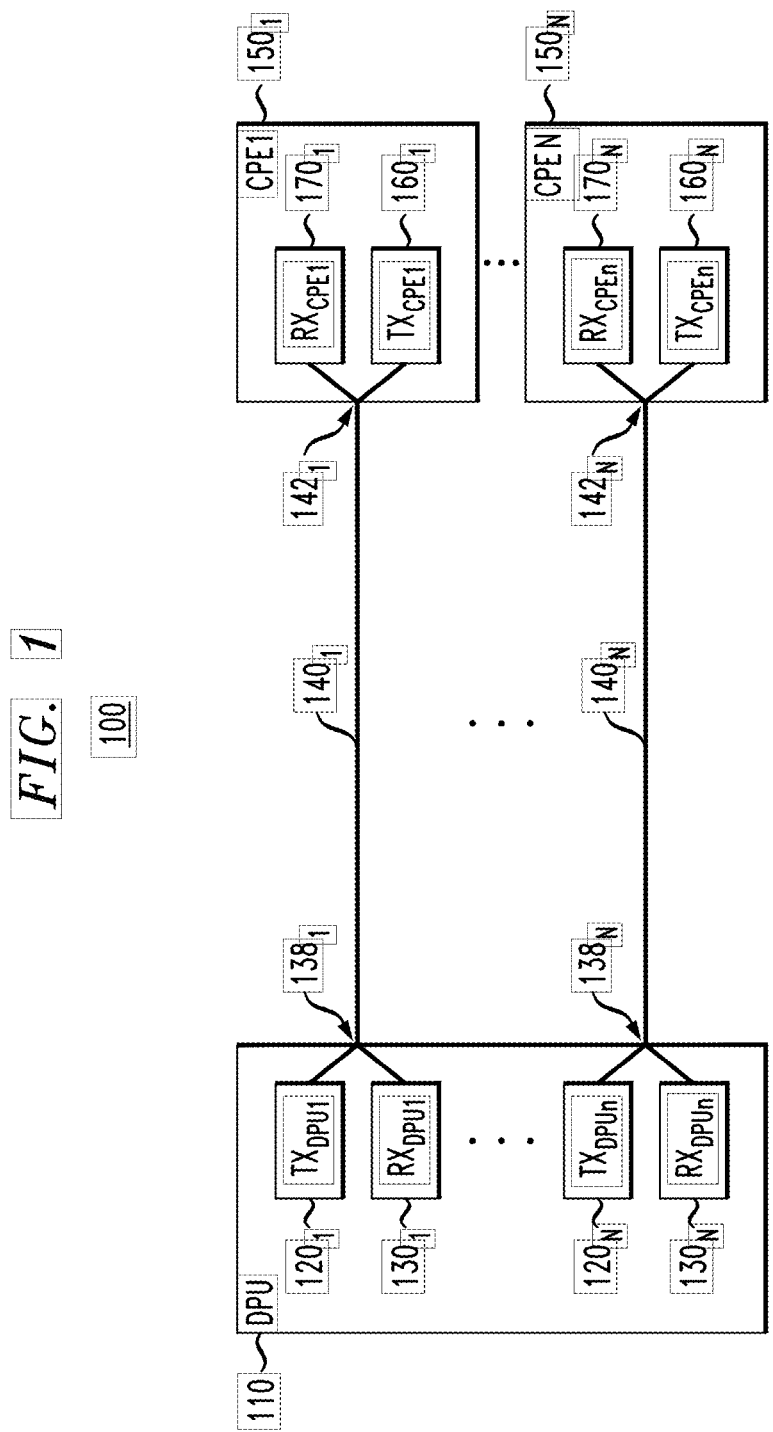
FIG. 1 shows a block diagram of a communication system in which various embodiments can be practiced.

FIG. 1 shows a block diagram of a communication system 100 in which various embodiments can be practiced. System 100 comprises a distribution point unit (DPU) 110 and a plurality of customer-premise-equipment (CPE) units $150_1$-$150_N$ connected by way of subscriber lines $140_1$-$140_N$ as indicated in FIG. 1. In some embodiments, DPU 110 may be located at a "central office" of the service provider (e.g., a telephone company). In some other embodiments, DPU 110 may be remotely deployed using one or more backhaul (e.g., optical) links to a location that is closer to the subscriber premises than that of the central office, and the corresponding equipment can be physically placed in a street cabinet, on a pole, in the basement of a building, etc. (also see FIG. 2). CPE units $150_1$-$150_N$ are typically located at different respective customer sites. In some embodiments, DPU 110 can be implemented and referred to as an access node (AN) 110.

Each of subscriber lines $140_1$-$140_N$ typically comprises a respective "twisted-pair" (or other suitable) cable configured to transmit signals corresponding to voice and/or data services. At DPU 110, each of subscriber lines $140_1$-$140_N$ is connected to a respective one of input/output (I/O) ports $138_1$-$138_N$. At the CPE side, each of subscriber lines $140_1$-$140_N$ is similarly connected to a respective one of I/O ports $142_1$-$142_N$, each being an I/O port of a respective one of CPE units $150_1$-$150_N$.

In an example embodiment, DPU (or AN) 110 comprises a plurality of transceivers ($120_i/130_i$, each internally connected to a respective one of I/O ports $138_1$-$138_N$, where i=1, 2, . . . , N. A transceiver ($120_i/130_i$) includes a respective transmitter $120_i$ and a respective receiver $130_i$. A CPE unit $150_i$ comprises a transceiver ($160_i/170_i$) internally connected to I/O port $142_i$ of that CPE unit. A transceiver ($160_i/170_i$) includes a respective transmitter $160_i$ and a respective receiver $170_i$. Example embodiments of transmitters 120, 160 are described in more detail below in reference to FIGS. 4-6. Example embodiments of receivers 130, 170 are described in more detail below in reference to FIGS. 3, 8, and 9.

In some embodiments, system 100 can be configured for Point-to-Multi-Point (P2MP) transmission, e.g., as contemplated in the context of the G.mgfast technology. For example, in one P2MP configuration, some of individual subscriber lines $140_1$-$140_N$ can be branched (not explicitly shown in FIG. 1) to each connect multiple respective CPE units 150 (typically located within the same premises) to DPU 110. A group of such CPE units 150 is thus connected to DPU 110 over the same (e.g., single corresponding) subscriber line 140. In another P2MP system configuration, different CPE units 150 can be connected to DPU 110 by different respective subscriber lines 140 (e.g., as shown in FIG. 1), but organized in P2MP groups such that only one CPE unit 150 within a P2MP group is allowed to be active on a specific tone at a time. This configuration can be implemented, e.g., for applying P2MP transmission across multiple customer premises (each having a respective CPE unit 150), and can thus be referred to as a multi-subscriber connection (MSC).

FIG. 2 shows a block diagram of an MSC system 200 according to an embodiment. System 200 is an example embodiment of system 100 corresponding to N=18, wherein CPE units $150_1$-$150_{18}$ are organized in six P2MP groups, which are labeled in FIG. 2 using the reference numerals $210_1$-$210_6$. DPU 110 of system 200 is connected to the corresponding external network(s) by way of an optical fiber 208 of a fiber-to-the-building (FTTB) infrastructure. Each P2MP group 210 includes three respective CPE units 150 located on a corresponding single floor of a building 202. In at least some embodiments, FDMA can be used as a media-access-control (MAC) mechanism to allocate which CPE units 150 within a P2MP group 210 are active on which tones. In operation, dynamic changes of the FDMA allocations can beneficially be used to dynamically redistribute bandwidths between the CPE units 150 within each P2MP group 210 as appropriate or necessary.

In various alternative embodiments, N CPE units $150_1$-$150_N$ can be organized in G groups 210, where G<N. At least some of the groups 210 include more than one CPE units 150. At least some groups 210 may have different respective numbers of CPE units 150 per group.

FIG. 3 shows a block diagram of a receiver 170 that can be used in system 100 (FIG. 1) according to an embodiment. Receiver 170 comprises an analog front end (AFE) 310, a digital front end (DFE) 320, and a digital signal processor (DSP) 330. Receiver 170 further comprises a local electronic controller 380 that may be used to control certain functions of one or both of receiver 170 and transmitter 160 of the same host CPE unit 150.

AFE 310 operates to convert a modulated electrical input signal 302 received through a corresponding I/O port 142 into a corresponding analog electrical radio-frequency (RF) signal 312 suitable for digitization in DFE 320. The typical analog signal processing applied to input signal 302 in AFE 310 includes amplification and filtering.

AFE 310 can be a conventional receiver-AFE circuit. Example receiver-AFE circuits that may be suitable for implementing some embodiments of AFE 310 are briefly reviewed, e.g., by N. Stojkovic in "ADSL Analog Front End," AUTOMATIKA v. 47 (2006), no. 1-2, pp. 59-67, which is incorporated herein by reference in its entirety.

DFE 320 operates to sample signal 312 at an appropriate sampling rate to generate a corresponding sequence 322 of digital samples (values). In an example embodiment, DFE 320 comprises an analog-to-digital converter (ADC) and other pertinent circuitry known to those skilled in the pertinent art.

In an example embodiment, DSP 330 comprises a demodulator 340, a symbol decoder 350, a deframer 360, and a decapsulation module 370. Demodulator 340 uses a Fourier transform, as known in the pertinent art, to perform time-domain (TD) to frequency-domain (FD) signal conversion, thereby converting sequence 322 into the corresponding sequence 342 of FD symbols. Symbol decoder 350 then applies constellation and carrier demapping to convert sequence 342 into the corresponding data frame(s) 352. Deframer 360 operates to extract the corresponding data transfer unit (DTU) 362 from data frame 352, e.g., by removing the frame header(s) and performing other pertinent operations as known in the art. A typical DTU includes a DTU header, a payload portion, and a cyclic-redundancy-check (CRC) portion. Decapsulation module 370 then extracts payload data 372 from DTUs 362 and directs the extracted data to external circuits.

In an example embodiment, controller 380 may control configuration settings and/or the scheduling associated with various receiver functions in response to a control signal 378 received via appropriate control channels, e.g., from DPU 110. For example, symbol decoder 350 may include a selector, which, under control of controller 380, determines which resource blocks (if any) can carry data for the subscriber associated with this CPE unit 150. These resource blocks may then be selected for decoding in symbol decoder 350, whereas the remaining resource blocks may be ignored or discarded.

FIG. 4 shows a block diagram of a transmitter 160 that can be used in system 100 (FIG. 1) according to an embodiment. Transmitter 160 comprises a DSP 410, a DFE 460, and an AFE 470. Transmitter 160 further comprises a local electronic controller 480 that may be used to control certain functions of the transmitter.

DSP 410 operates to carry out data encoding and FD-to-TD signal conversion to generate a digital output signal 452 having encoded thereon an input data stream 402. DFE 460 operates to convert digital signal 452 into an analog form (e.g., using a digital-to-analog converter, DAC) to generate a corresponding analog electrical signal 462. AFE 470 then converts signal 462 into a form suitable for transmission over a subscriber line 140 and applies a resulting modulated electrical signal 472 to a corresponding I/O port 142.

Example transmitter-AFE circuits suitable for implementing at least some embodiments of AFE 470 are briefly reviewed, e.g., in the above-cited paper by N. Stojkovic. In some embodiments, AFE 310 and AFE 470 belonging to the same CPE unit 150 can share some circuit elements, such as a clocking system and an electrical hybrid. In an example embodiment, DSP 410 comprises an encapsulation module 420, a framer 430, a symbol encoder 440, and a modulator 450. Encapsulation module 420 operates to encapsulate input data 402, as payload data, into DTUs 422. As already indicated above, in addition to the payload data portion, a DTU may include a DTU header and a CRC portion. Framer 430 then uses DTUs 422 to generate data frames 432, e.g., by adding frame headers and performing other appropriate operations. Symbol encoder 440 performs constellation and carrier mapping to generate FD symbols 442, each comprising a set of constellation symbols intended for transmission using a different respective tone (having a different respective carrier frequency). Depending on the specific embodiment, the number of tones used in symbol encoder 440 can be on the order of one hundred, one thousand, or even greater than one thousand. Modulator 450 uses an inverse Fourier transform, as known in the pertinent art, for FD-to- TD signal conversion, thereby converting FD symbols 442 into digital signal 452 representing the corresponding TD waveforms.

In an example embodiment, controller 480 may control configuration settings and/or the scheduling associated with various transmitter functions in response to a control signal 478 received via appropriate control channels, e.g., from DPU 110. As already indicated above, in some embodiments, controllers 380 (FIG. 3) and 480 of the same host CPE unit 150 may be integrated into a single controller.

Figure 5:
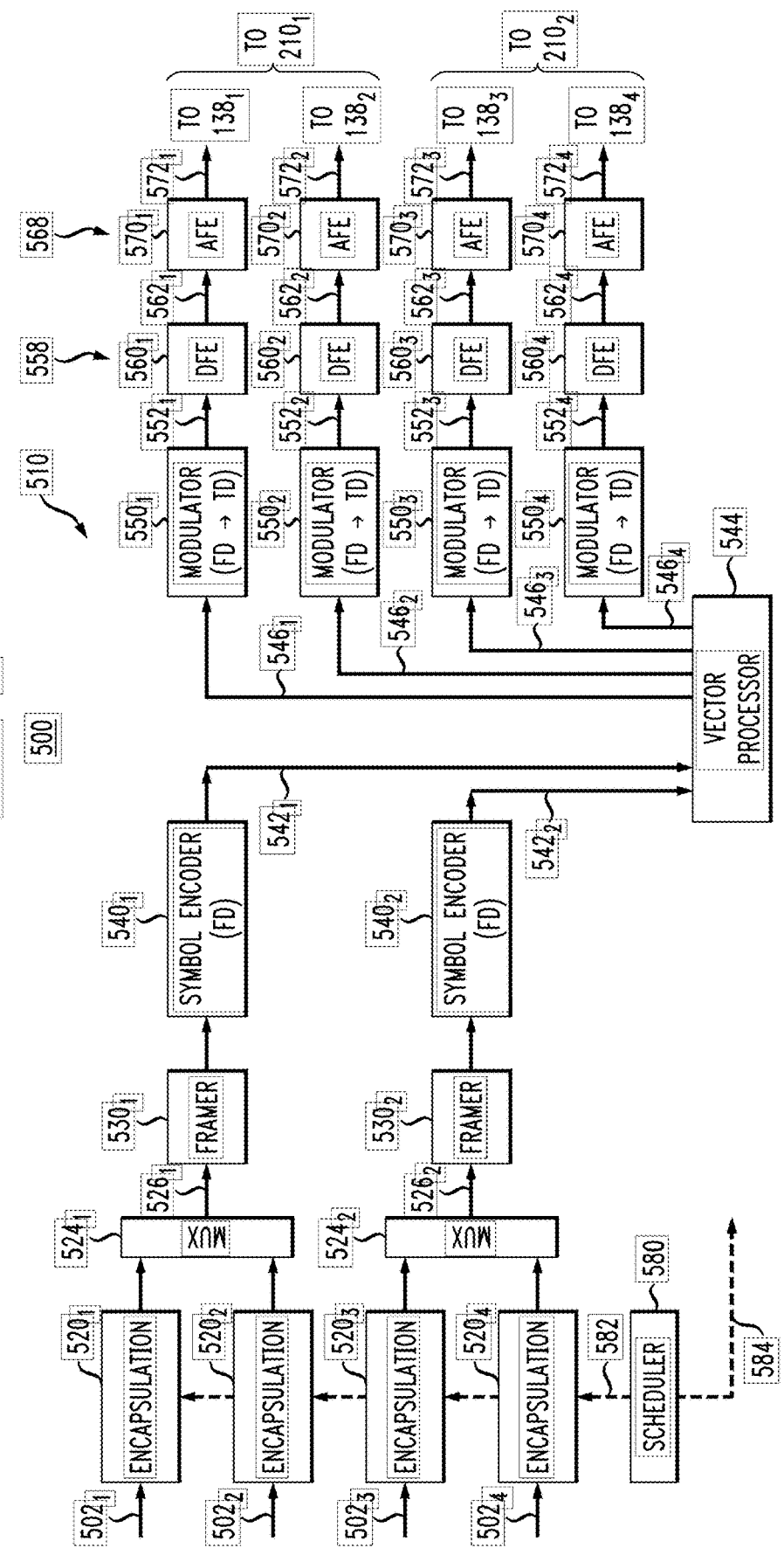
FIG. 5 shows a block diagram of a multi-line transmitter that can be used in the communication system of FIG. 1 according to an embodiment.

FIG. 5 shows a block diagram of a multi-line transmitter 500 that can be used in DPU 110 (FIG. 1) according to an embodiment. For example, transmitter 500 can be used to implement transmitters 120$_1$-120$_N$ (FIG. 1). For illustration purposes and without any implied limitations, transmitter 500 is shown and described in reference to an example embodiment corresponding to N=4 and G=2, wherein each group 210 has two respective CPE units 150. From the provided description, a person of ordinary skill in the art will be able to make and use, without any undue experimentation, other embodiments, e.g., corresponding to other values of N, other values of G, and/or other numbers of CPE units 150 per group 210.

As shown in FIG. 5, transmitter 500 comprises a DSP 510, a DFE 558, and an AFE 568. Transmitter 500 further comprises an electronic scheduler 580 that may be used to control certain functions of the transmitter and/or of the corresponding CPE units 150. In an example embodiment, transmitter 500 can be configured to operate using some of the methods described below in reference to FIGS. 7 and 11.

In an example embodiment, DSP 510 comprises encapsulation modules 520$_1$-520$_N$, multiplexers 524$_1$-524$_G$, framers 530$_1$-530$_G$, symbol encoders 540$_1$-540$_G$, a vector processor 544, and modulators 550$_1$-550$_N$. As already indicated above, for the shown embodiment, N=4 and G=2. Each multiplexer 524 has a single output and as many inputs as there are CPE units 150 in the corresponding group 210. In the shown example embodiment, each of multiplexers 524$_1$-524$_2$ is a 2×1 multiplexer.

Encapsulation modules 520$_1$-520$_N$ and multiplexers 524$_1$-524$_G$ operate to encapsulate input data 502$_1$-502$_N$, as payload data, into DTUs 526$_1$-526$_G$. In an example embodiment, scheduler 580 controls the operation of encapsulation modules 520$_1$-520$_N$ such that only one subscriber in each of groups 210$_1$-210$_G$ is selected to convey data in each resource block, with the amount of data that can be communicated for each subscriber in a given resource block being a known quantity. Framers 530$_1$-530$_G$ and symbol encoders 540$_1$-540$_G$ operate to frame and encode the received DTUs 526$_1$-526$_G$, thereby producing G different encoded data blocks 542$_1$-542$_G$. For example, for a resource block of T subcarriers, the encoded data blocks 542$_1$-542$_G$ can be represented by a G×T matrix of complex values.

Vector processor 544 operates to convert data blocks 542$_1$-542$_G$ into data blocks 546$_1$-546$_N$, e.g., as described in more detail below in reference to FIG. 7. The conversion is implemented in a manner that: (i) substantially cancels crosstalk between subscribers of different groups 210 and (ii) for each group 210, enables a respective common data signal to be conveyed to all CPE units 150 of the group.

Each modulator 550$_i$ uses an inverse Fourier transform, as known in the pertinent art, for FD-to-TD signal conversion, thereby converting data block 546$_i$ into a digital signal 552$_i$ representing the corresponding TD waveform. Digital signals 552$_1$-552$_N$ generated in this manner are then applied to DFE 558.

DFE 558 comprises line DFEs 560$_1$-560$_N$. Line DFE 560$_i$ operates to convert digital signal 552$_i$ into an analog form (e.g., using a digital-to-analog converter, DAC) to generate a corresponding analog electrical signal 562$_i$. Analog electrical signal 562$_1$-562$_N$ generated in this manner are then applied to AFE 568.

AFE 568 comprises line AFEs 570$_1$-570$_N$. Line AFE 570$_i$ operates to convert analog electrical 562$_i$ into a form suitable for transmission over subscriber line 140$_i$ and applies a resulting modulated electrical signal 572$_i$ to a corresponding I/O port 138$_i$.

Figure 6:
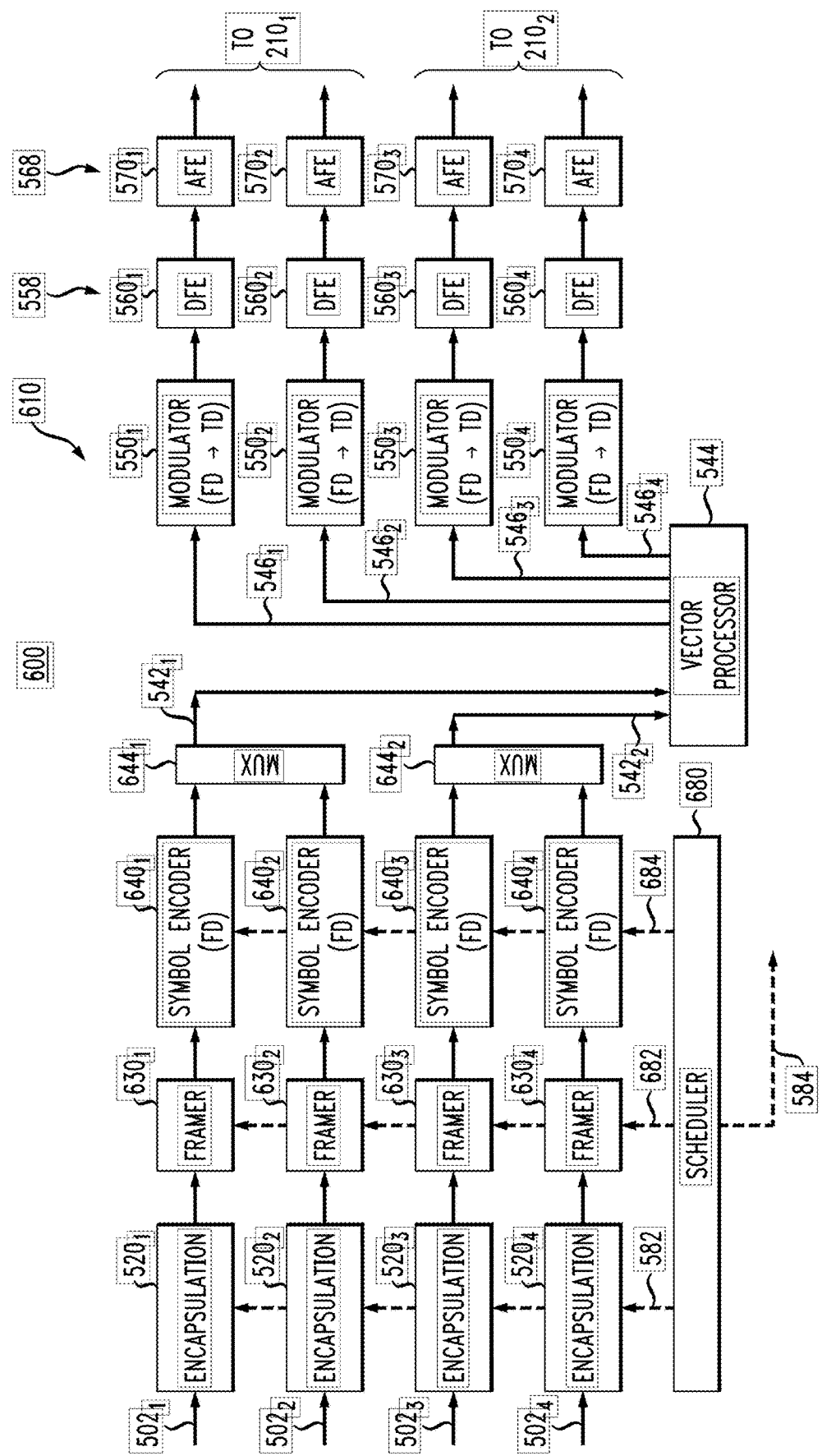
FIG. 6 shows a block diagram of a multi-line transmitter that can be used in the communication system of FIG. 1 according to an alternative embodiment.

FIG. 6 shows a block diagram of a multi-line transmitter 600 that can be used in DPU 110 (FIG. 1) according to an alternative embodiment. Transmitter 600 is implemented using many of the same elements as transmitter 500 (FIG. 5). The description of those elements is not repeated here. Rather, the following description of transmitter 600 mainly focuses on the differences between transmitters 500 and 600.

Transmitter 600 comprises a DSP 610, DFE 558, and AFE 568. DSP 610 comprises encapsulation modules 520$_1$-520$_N$, framers 630$_1$-630$_N$, symbol encoders 640$_1$-640$_N$, multiplexers 644$_1$-644$_G$, vector processor 544, and modulators 550$_1$-550$_N$. Transmitter 600 further comprises an electronic scheduler 680 that may be used to control certain functions of the transmitter and/or of the corresponding CPE units 150. Scheduler 680 differs from scheduler 580 in that scheduler 680 is additionally configured to control framers 630$_1$-630$_N$ and symbol encoders 640$_1$-640$_N$ using control signals 682 and 684, respectively. In an example embodiment, scheduler 680 generates control signals 582, 682, and 684 such that: (i) only one subscriber in each of groups 210$_1$-210$_G$ is selected to convey data in each resource block and (ii) encapsulation modules 520$_1$-520$_N$, framers 630$_1$-630$_N$, and symbol encoders 640$_1$-640$_N$ process appropriate respective amounts of data for each resource block.

Each multiplexer 644 has a single output and as many inputs as there are CPE units 150 in the corresponding group 210. In the shown example embodiment, each of multiplexers 644$_1$-644$_2$ is a 2×1 multiplexer. Multiplexer 644$_1$ is configured to generate data blocks 542$_1$ using encoded data blocks 642$_1$-642$_2$ outputted by symbol encoders 640$_1$-640$_2$, respectively. Multiplexer 644$_2$ is similarly configured to generate data blocks 542$_2$ using encoded data blocks 642$_3$-642$_4$ outputted by symbol encoders 640$_3$-640$_4$, respectively.

Figure 7:
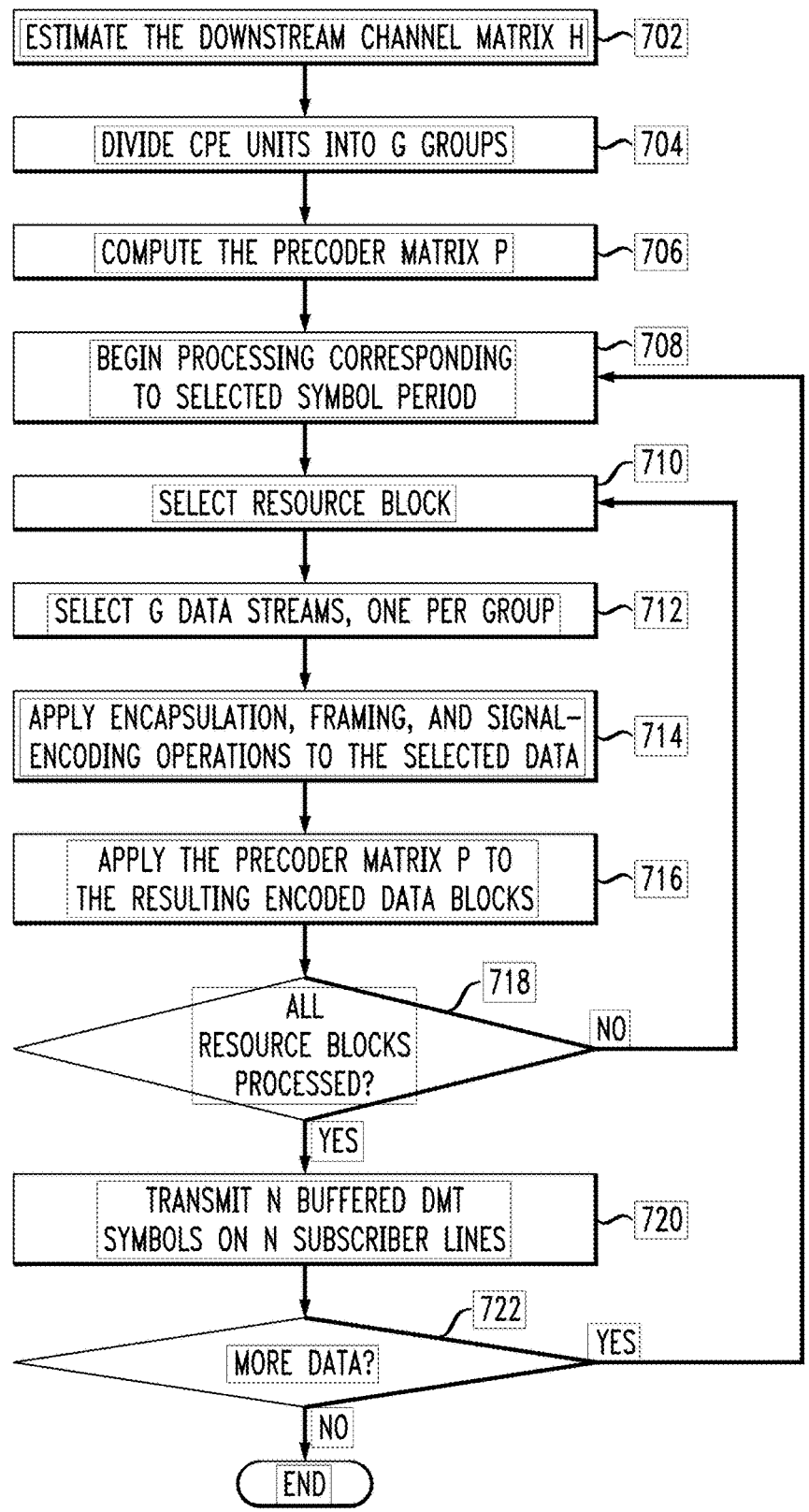
FIG. 7 shows a flowchart of a downlink communication method that can be used in the communication system of FIG. 1 according to an embodiment.

FIG. 7 shows a flowchart of a communication method 700 that can be used to operate transmitter 500 (FIG. 5) according to an embodiment. Method 700 is described in continued reference to FIGS. 1 and 5. A person of ordinary skill in the art will understand how to adapt method 700 for operating transmitter 600 (FIG. 6). In an example embodiment, method 700 may be executed using processor 510 and/or other appropriate circuitry, e.g., a system controller.

Method 700 begins at step 702, at which the downlink channel matrix H is estimated for each subcarrier (tone). In an example embodiment, the matrix H is an N×N matrix, wherein each matrix element $H_{ij}$ represents the coupling of a signal transmitted on subscriber line 140$_j$ to subscriber line 140$_i$. As such, non-diagonal elements of the matrix H represent the interline crosstalk on the corresponding subcarrier frequency.

In an example embodiment, step 702 can be implemented using conventional channel-estimation techniques, such as those used in conventional vectored OFDM systems. For example, step 702 may include the sub-steps of: (i) transmitting one or more pilot signals on subscriber line 140$_i$; (ii) measuring the corresponding signals received by CPE units 150$_1$-150$_N$; and (iii) communicating the measurement results back to DPU 110. These sub-steps are typically repeated as appropriate or necessary until all $H_{ij}$ values of the matrix H are properly estimated.

At step 704, CPE units $150_1$-$150_N$ are divided into G groups 210 using any suitable criteria. For example, the G groups 210 can be defined such that the groups have approximately (e.g., within ±20%) equal sizes (i.e., ≈N/G). In some embodiments, the selection of CPE units 150 for each group 210 may be random or arbitrary. In some other embodiments, the process of grouping CPE units 150 into groups 210 may take into account the channel estimates of step 702 and/or other predetermined or pertinent criteria.

At step 706, a suitable algorithm is run to compute a precoder matrix P. The computed precoder matrix P is then stored in the nonvolatile memory of vector processor 544 and used in the subsequent steps of method 700, e.g., as described below.

In an example embodiment, the precoder matrix P is an N×G matrix having the following property: the g-th column of the matrix R is approximately zero in all rows, except for the rows corresponding to the group $210_g$, where the matrix R is the product of the matrices H and P (i.e., R=HP), and g=1, 2, . . . , G. Eq. (1) provides a mathematical representation of this property for the embodiment of FIG. 5:

$$R = \begin{bmatrix} H_{11} & H_{12} & H_{13} & H_{14} \\ H_{21} & H_{22} & H_{23} & H_{24} \\ H_{31} & H_{32} & H_{33} & H_{34} \\ H_{41} & H_{42} & H_{43} & H_{44} \end{bmatrix} \begin{bmatrix} P_{11} & P_{12} \\ P_{21} & P_{22} \\ P_{31} & P_{32} \\ P_{41} & P_{42} \end{bmatrix} = \begin{bmatrix} a & \approx 0 \\ b & \approx 0 \\ \approx 0 & c \\ \approx 0 & d \end{bmatrix} \quad (1)$$

where $P_{ng}$ are the matrix elements of the precoder matrix P; and a, b, c, and d are the non-zero matrix elements of the matrix R. The values of a and b correspond to the end-to-end communication paths from a respective precoder input towards CPE units 150 of group $210_1$. The values of c and d similarly correspond to the end-to-end communication paths from a respective precoder input towards CPE units 150 of group $210_2$. The term "approximately zero," as used herein in reference to other elements of the matrix R, should be construed as meaning that the absolute values of said matrix elements are much smaller than the absolute values of a, b, c, and/or d. A person of ordinary skill in the art will understand that, if the matrix R represents the transfer function for the transmission of independent communication signals $x_1$ and $x_2$ corresponding to groups $210_1$ and $210_2$, respectively, then the signals received by CPE units $150_1$-$150_4$ in the embodiment of FIG. 5 are $a \times x_1$, $b \times x_1$, $c \times x_2$, and $d \times x_2$, respectively.

The above example clearly illustrates that the effect of the precoder matrix P can be such that: (i) crosstalk between subscribers in different groups 210 is substantially canceled and (ii) for each group 210, a respective common data signal is conveyed to all CPE units 150 of the group, e.g., for time-wise and/or frequency-wise selection and detection by the respective receivers of the respective subscriber payloads.

Under appropriate indexing of the CPE units $150_i$ of different groups $210_g$, the task of generating the precoder matrix P corresponds to the mathematical problem of finding an N×G transformer matrix that transforms the channel matrix H into a corresponding block-diagonal matrix R. A person of ordinary skill in the art will understand that many block-diagonalization techniques suitable for solving this mathematical problem are known in the field of linear algebra. As such, in different embodiments, step 706 may be implemented using different ones of such techniques.

In one possible embodiment, the algorithm for generating the precoder matrix P at step 706 of method 700 can be based on the following optimization algorithm.

The algorithm is generally directed at maximizing the quantity Q(S) expressed by Eq. (2):

$$Q(S) = \sum_k \sum_g \sum_{n \in G_g} \log_2\left(1 + \frac{1}{\Gamma \sigma_k^n} \left| [H_k]_{n,:} [P_k]_{:,g} \right|^2 \right) \quad (2)$$

The maximization of Q(S) can be performed under the following constraints:

$$\forall n : \sum_k [P_k P_k^H]_{n,n} \leq ATP_n \quad (3)$$

$$\forall n, k : 0 \leq [P_k P_k^H]_{n,n} \leq \sigma_k^{mask,n} \quad (4)$$

$$[H_k P_k]_{i,j} = 0, \forall i, j : i \notin G_j \quad (5)$$

where $P_k = \hat{P}_k S_k B$. Constraints (3), (4), and (5) can be referred to as the aggregate transmit power (ATP) constraint, the mask constraint, and the block-diagonalization constraint, respectively. The various quantities used in Eqs. (2)-(5) are defined as follows:

$H_k$ N×N channel matrix corresponding to the k-th tone;
$[H_k]_{n,:}$ n-th row of the matrix $H_k$;
$G_n$ set of CPE units 150 in group $210_n$;
$\hat{P}_k$ N×N precoder matrix for the k-th tone;
$P_k$ N×G precoder matrix for the k-th tone to be stored for subsequent use in vector processor 544;
$[P_k]_{:,g}$ g-th column of the precoder matrix $P_k$;
$S_k$ N×N diagonal, gain-scaling matrix for the k-th tone;
$\Gamma$ SNR gap;
$\sigma_k^n$ noise on the k-th tone of subscriber line $140_n$ at CPE unit $150_n$;
$ATP_n$ aggregate transmit-power constraint corresponding to the n-th subscriber;
$\sigma_k^{mask,n}$ PSD-mask constraint for the n-th subscriber on the k-th tone;
S collection of the scaling matrices over all tones k; and
B N×G zero-one matrix, wherein the matrix element $B_{n,g}=1$ if the n-th subscriber belongs to group $210_g$.

In an example embodiment, the above-defined algorithm can be implemented using the following generalized processing sub-steps;
   (i) reading from the memory the full N×N channel matrix H estimated at step 702;
   (ii) generating the N×N precoder matrix $\hat{P}_k$ by inverting the full N×N channel matrix H (or a denormalized version thereof);
   (iii) optionally, for each group 210, replacing the $N_g$ columns of $\hat{P}_k$ corresponding to the subscribers in the group, with $N_g$ mutually orthogonal columns obtained by applying the Gram-Schmidt orthogonalization procedure to those columns of $\hat{P}_k$.
   (iv) scaling the columns of the precoder matrix $\hat{P}_k$ by multiplying the matrix $\hat{P}_k$ by a diagonal gain scaling matrix $S_k$; and
   (v) generating the N×G precoder matrix $P_k$ by summing the columns of the scaled N×N precoder matrix $\hat{P}_k S_k$ that correspond to each group 210.

In different embodiments, different suitable algorithms can be used to determine the diagonal gain scaling matrices $S_k$ in the corresponding sub-step(s) of step 706. For illustration purposes and without any implied limitations, two examples of such suitable algorithms are provided below. A person of ordinary skill in the pertinent art will understand that other suitable algorithms may alternatively be used.

Sub-Step 706-A

Determine power budgets $p_k^n$ using waterfilling, as follows. Define $$p_k^n(\tau_n) = \min\left(\max\left(\tau_n - \frac{\Gamma \sigma_k^n}{|[H_k]_{n,n}|^2}, 0\right), \sigma_k^{mask,n}\right)$$

and, for each n, choose the maximum $\tau_n$ such that $$\sum_k p_k^n(\tau_n) \le ATP_n.$$

Next, apply column-norm gain scaling, as follows. For each n, g, k, define $$M_{ng}^k = |[\hat{P}_k B]_{ng}|^2 (p_k^n(\tau_n))^{-1}$$

and compute $$c_g^k = \sum_n M_{ng}^k \text{ and } \alpha_k = \max_n \sum_g \frac{M_{ng}^k}{c_g^k}.$$

Finally, for group g, for each i in $G_g$, let $S_{ii}^k = (\alpha_k c_g^k)^{-1/2}$.

Sub-Step 706-B

Choose initial scaling matrix $S_k[0]$ using sub-step 706-A, e.g., as described above. Then, using iterative constrained optimization methods (such as, gradient ascent, iterative convex approximation, trust region methods, etc.) known to those skilled in the pertinent art, find a sequence of improved scaling matrices $S_k[1]$, $S_k[2]$, . . . that converge to a local maximum of the objective Q in Eq. (2), subject to constraints given by Eqs. (3), (4), and (5). In this example optimization procedure, there are NK optimization variables (i.e., the N diagonal elements of $S_k$, for K tones), each of which diagonal elements can be a complex value.

At step 708, transmitter 500 is configured to begin the signal processing corresponding to a selected symbol period.

At step 710, a resource block is selected for which the next round of signal-processing operations is to be performed.

At step 712, scheduler 580 is used to select one data stream 502 in each group 210 for transmission in the selected symbol period/resource block. Thereby, G subscribers for which the transmission is intended are selected.

At step 714, processor 510 operates to advance the signal processing through the encapsulation, framing, and signal-encoding operations. The circuits used at step 714 are a subset of encapsulation modules $520_1$-$520_N$, the framers $530_1$-$530_G$, and the symbol encoders $540_1$-$540_G$. As a result, encoded data blocks $542_1$-$542_G$ carrying the data selected at step 712 are generated.

At step 716, vector processor 544 operates to apply the precoder matrix P computed at step 706 to encoded data blocks $542_1$-$542_G$ generated at step 714 to generate the corresponding data blocks $546_1$-$546_N$. Said data blocks $546_1$-$546_N$ may temporarily be stored in a buffer to allow for additional resource blocks (if any) to be processed.

Step 718 serves to determine whether or not the processing of all resource blocks corresponding to the selected symbol period is completed. If yes, then the processing of method 700 is directed to step 720. Otherwise, the processing of method 700 is directed back to step 710 where another resource block can be selected for processing.

At step 720, transmitter 500 operates to transmit the N buffered DMT symbols corresponding to the selected symbol period on subscriber lines $140_1$-$140_N$, respectively. The circuits used at step 720 are modulators $550_1$-$550_N$, DFE 558, and AFE 568.

Step 722 serves to determine whether or not there are more data for downlink transmission. If yes, then the processing of method 700 is directed back to step 708 where the processing corresponding to another symbol period can begin. Otherwise, the processing of method 700 is terminated.

Figure 8:
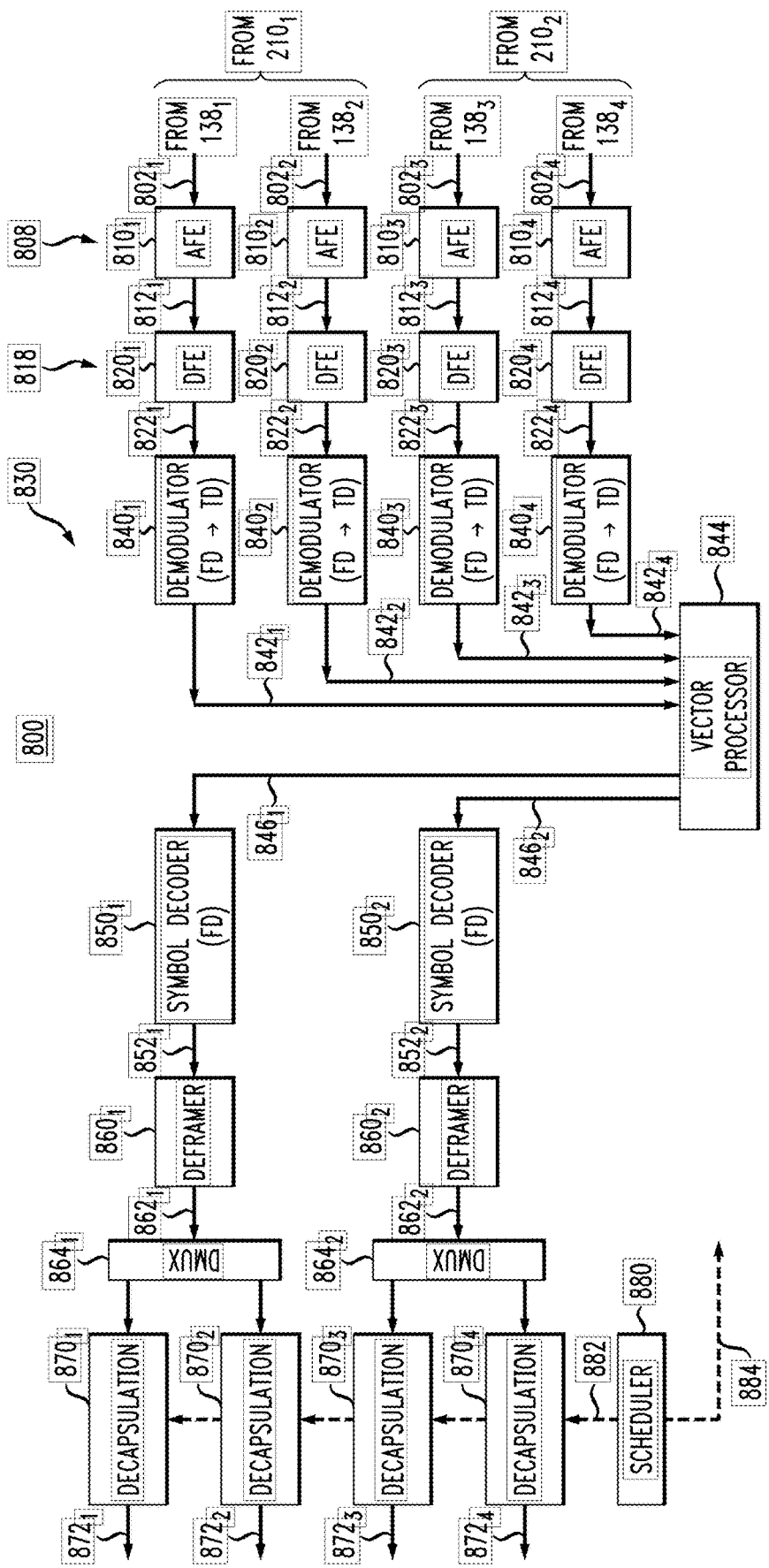
FIG. 8 shows a block diagram of a multi-line receiver that can be used in the communication system of FIG. 1 according to an embodiment.

FIG. 8 shows a block diagram of a multi-line receiver 800 that can be used in DPU 110 (FIG. 1) according to an embodiment. For example, receiver 800 can be used to implement receivers $130_1$-$130_N$ (FIG. 1). For illustration purposes and without any implied limitations, receiver 800 is shown and described in reference to an example embodiment corresponding to N=4 and G=2, wherein each group 210 has two respective CPE units 150. From the provided description, a person of ordinary skill in the art will be able to make and use, without any undue experimentation, other embodiments, e.g., corresponding to other values of N, other values of G, and/or other numbers of CPE units 150 per group 210.

In some embodiments, groups 210 used for downlink transmissions (e.g., as described in reference to FIGS. 5-7) may be different from groups 210 used for uplink transmissions. The differences may include one or more of the following: (i) the uplink and downlink numbers G may be different; (ii) the sets of numbers of CPE units 150 per uplink and downlink group 210 may be different; and (iii) the composition of uplink and downlink group 210 may be different.

As shown in FIG. 8, receiver 800 comprises an AFE 808, a DFE 818, and a DSP 830. Receiver 800 further comprises an electronic scheduler 880 that may be used to control certain functions of the receiver and/or of the corresponding CPE units 150. In an example embodiment, receiver 800 can be configured to operate using some of the methods described below in reference to FIGS. 10 and 11.

AFE 808 comprises line AFEs $810_1$-$810_N$. Line AFE $810_1$ operates to convert a modulated electrical input signal $802_1$ received through a corresponding I/O port $138_1$ into a corresponding analog electrical RF signal $812_1$ suitable for digitization in DFE 818. The typical analog signal processing applied to input signal $802_i$ in AFE $810_1$ includes amplification and filtering.

DFE 818 comprises line DFEs $820_1$-$820_N$. DFE $820_1$ operates to sample signal $812_i$ at an appropriate sampling rate to generate a corresponding sequence $822_i$ of digital samples (values). In an example embodiment, DFE $820_1$ comprises an ADC and other pertinent circuitry known to those skilled in the pertinent art.

In an example embodiment, DSP 830 comprises demodulators $840_1$-$840_N$, a vector processor 844, symbol decoders $850_1$-$850_G$, deframers $860_1$-$860_G$, demultiplexers $864_1$-$864_G$, and decapsulation modules $870_1$-$870_N$. As already indicated above, for the shown embodiment, N=4 and G=2. Each demultiplexer 864 has a single input and as many outputs as there are CPE units 150 in the corresponding group 210. In the shown example embodiment, each of demultiplexers $864_1$-$864_2$ is a 1×2 demultiplexer.

Demodulator $840_i$ uses a Fourier transform, as known in the pertinent art, to perform TD-to-FD signal conversion, thereby converting sequence $822_i$ into the corresponding sequence of FD symbols. Data blocks $842_1$-$842_N$ carrying the FD symbols generated in this manner are then applied to vector processor 844.

Vector processor 844 operates to convert data blocks $842_1$-$842_N$ into data blocks $846_1$-$846_G$, e.g., as described in more detail below in reference to FIG. 10. The conversion is implemented in a manner that: (i) substantially cancels crosstalk between subscribers of different groups 210 and (ii) for each group 210, enables a respective data signal that has been transmitted by the corresponding active CPE units 150 of the group to be extracted. As already indicated above, only one CPE 150 per group 210 is allowed to transmit on a specific tone at a time, e.g., in response to a control signal 884 generated by scheduler 880.

Symbol decoder $850_g$ applies constellation and carrier demapping to convert data block(s) $846_g$ into the corresponding data frame(s) $852_g$. Deframer $860_g$ then operates to extract the corresponding DTU $862_g$ from each data frame $852_g$, e.g., by removing the frame header(s) and performing other pertinent operations as known in the art. Demultiplexers $864_1$-$864_G$ and decapsulation modules $870_1$-$870_N$ then operate to extract payload data $872_1$-$872_N$ from DTUs $862_1$-$862_G$ and direct the extracted data to external circuits. In an example embodiment, scheduler 880 controls the operation of decapsulation modules $870_1$-$870_N$, via a control signal 882, e.g., such that each decapsulation modules $870_1$ extracts data from appropriate resource blocks of the DTU $862_g$.

Figure 9:
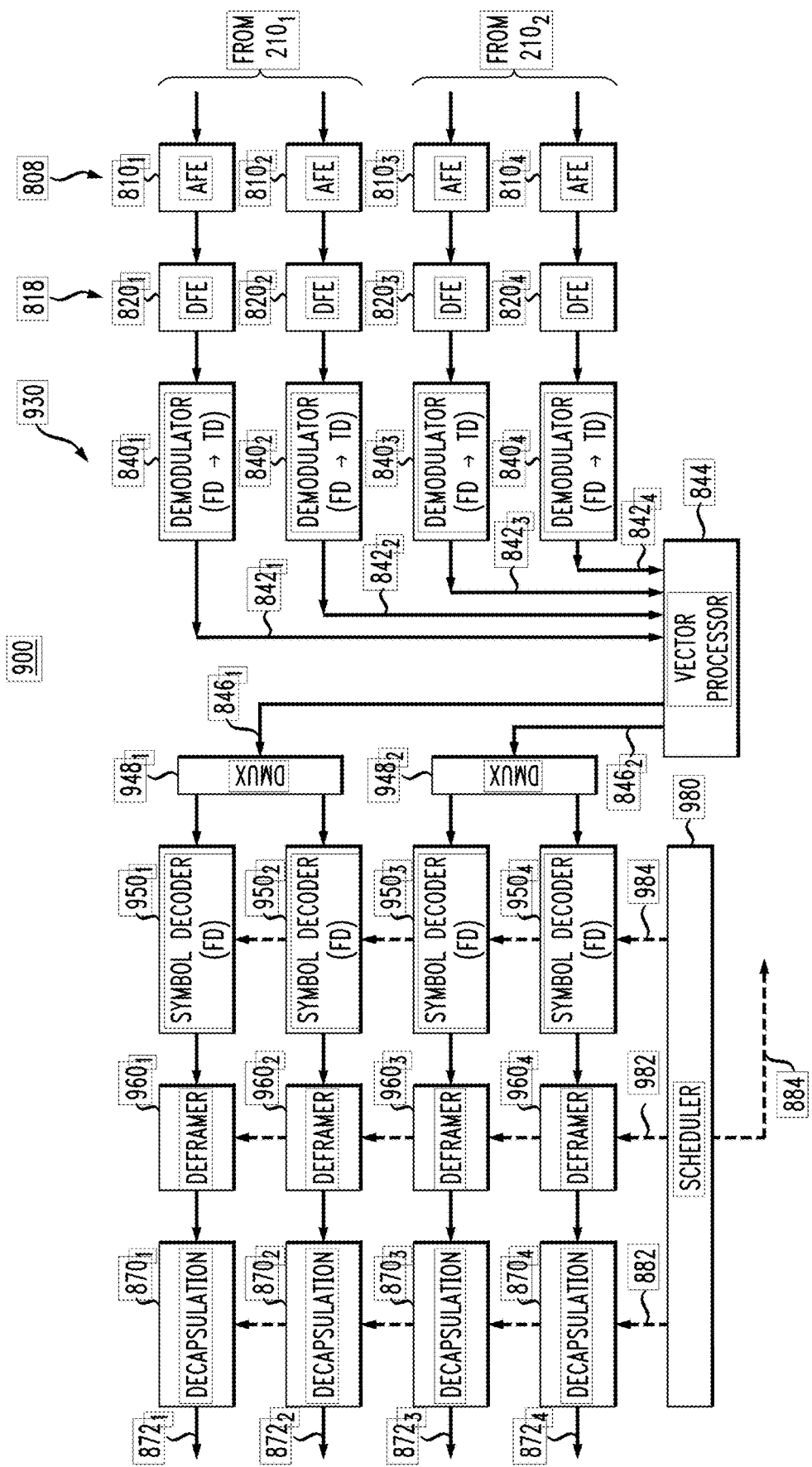
FIG. 9 shows a block diagram of a multi-line receiver that can be used in the communication system of FIG. 1 according to an alternative embodiment.

FIG. 9 shows a block diagram of a multi-line receiver 900 that can be used in DPU 110 (FIG. 1) according to an alternative embodiment. Receiver 900 is implemented using many of the same elements as receiver 800 (FIG. 8). The description of those elements is not repeated here. Rather, the following description of receiver 900 mainly focuses on the differences between receivers 800 and 900.

Receiver 900 comprises AFE 808, DFE 818, and a DSP 930. DSP 930 comprises demodulators $840_1$-$840_N$, vector processor 844, demultiplexers $948_1$-$948_G$, symbol decoders $950_1$-$950_N$, deframers $960_1$-$960_N$, and decapsulation modules $870_1$-$870_N$. Receiver 900 further comprises an electronic scheduler 980 that may be used to control certain functions of the receiver and/or of the corresponding CPE units 150. Scheduler 980 differs from scheduler 880 in that scheduler 980 is additionally configured to control deframers $960_1$-$960_N$ and symbol decoders $950_1$-$950_N$ using control signals 982 and 984, respectively. In an example embodiment, scheduler 980 generates control signals 882, 982, and 984 such that symbol decoders $950_1$-$950_N$, deframers $960_1$-$960_N$, and decapsulation modules $870_1$-$870_N$ process appropriate sets and amounts of data corresponding to data blocks $846_1$-$846_G$.

Each demultiplexer 948 has a single input and as many outputs as there are CPE units 150 in the corresponding group 210. In the shown example embodiment, each of multiplexers $948_1$-$948_2$ is a 1×2 demultiplexer. Demultiplexer $948_1$ is configured to demultiplex data blocks $846_1$ to feed symbol decoders $950_1$-$950_2$. Demultiplexer $948_2$ is similarly configured to demultiplex data blocks $846_2$ to feed symbol decoders $950_3$-$950_4$.

FIG. 10 shows a flowchart of a communication method 1000 that can be used to operate receiver 800 (FIG. 8) according to an embodiment. Method 1000 is described in continued reference to FIGS. 1 and 8. A person of ordinary skill in the art will understand how to adapt method 1000 for operating receiver 900 (FIG. 9). In an example embodiment, method 1000 may be executed using processor 830 and/or other appropriate circuitry, e.g., a system controller.

Method 1000 begins at step 1002, at which the uplink channel matrix H is estimated for each subcarrier (tone). In an example embodiment, the matrix H is an N×N matrix, wherein each matrix element $H_{ij}$ represents the coupling of a signal transmitted on subscriber line $140_j$ to I/O port $138_i$. As such, non-diagonal matrix elements of the matrix H represent the interline crosstalk on the corresponding subcarrier frequency.

In an example embodiment, step 1002 can be implemented using conventional channel-estimation techniques, such as those used in conventional vectored OFDM systems. For example, step 1002 may include the sub-steps of: (i) transmitting one or more pilot signals from CPE unit $150_i$ on subscriber line $140_i$ and (ii) measuring the corresponding received signals at receiver 800. These sub-steps are typically repeated as appropriate or necessary until all $H_{ij}$ values of the matrix H are properly estimated.

At step 1004, CPE units $150_1$-$150_N$ are divided into G groups 210 using any suitable criteria. In an example embodiment, step 1004 can be similar to step 704 of method 700 (FIG. 7). In some embodiments, the process of grouping CPE units 150 into groups 210 may take into account the channel estimates of step 1002.

At step 1006, a suitable algorithm is run to compute a postcoder matrix P. The computed postcoder matrix P is then stored in the nonvolatile memory of vector processor 844 and used in the subsequent steps of method 1000, e.g., as indicated below.

In an example embodiment, step 1006 can be similar to step 706 of method 700 (FIG. 7), subject to relatively straightforward modifications that reflect the differences between the precoder matrix P used in method 700 and the postcoder matrix P used in method 1000. In particular, it should be noted that, on the uplink, the transfer function $R_u$ can be approximated using Eq. (6):

$$R_u = PH \tag{6}$$

in which the postcoder matrix P is to the left of the uplink channel matrix H. In contrast, on the downlink, the transfer function R is approximated by R=HP (also see, e.g., Eq. (1)), wherein the precoder matrix P is to the right of the downlink channel matrix H. In an example embodiment, the postcoder matrix P is a G×N matrix having the following property: the g-th row of the matrix $R_u$ is approximately zero in all columns, except for the columns corresponding to the group $210_g$, where g=1, 2, . . . , G. Eq. (7) provides a mathematical representation of this property for the embodiment of FIG. 8:

$$R_u = \begin{bmatrix} p_{11} & p_{12} & p_{13} & p_{14} \\ p_{21} & p_{22} & p_{23} & p_{24} \end{bmatrix} \tag{7}$$

-continued $$\begin{bmatrix} H_{11} & H_{12} & H_{13} & H_{14} \\ H_{21} & H_{22} & H_{23} & H_{24} \\ H_{31} & H_{32} & H_{33} & H_{34} \\ H_{41} & H_{42} & H_{43} & H_{44} \end{bmatrix} = \begin{bmatrix} a & b & \approx 0 & \approx 0 \\ \approx 0 & \approx 0 & c & d \end{bmatrix}$$

where $P_{gn}$, are the matrix elements of the postcoder matrix P; and a, b, c, and d are the non-zero matrix elements of the matrix $R_u$. The values of a and b correspond to the end-to-end communication paths from CPE units 150 of group 210₁ to a respective postcoder output. The values of c and d similarly correspond to the end-to-end communication paths from CPE units 150 of group 210₂ to a respective postcoder output.

The term "approximately zero," as used herein in reference to other elements of the matrix $R_u$, should be construed as meaning that the absolute values of said matrix elements are much smaller than the absolute values of a, b, c, and/or d. A person of ordinary skill in the art will understand that, if the matrix $R_u$ represents the transfer function for the transmission of independent communication signals $x_1$, and $x_2$, corresponding to CPE units 150 of group 210₁ and independent communication signals $x_3$, and $x_4$ corresponding to CPE units 150 of group 210₂, then the signals received by symbol decoders 850₁ and 850₂ in the embodiment of FIG. 8 are $a \times x_1 + b \times x_2$, and $c \times x_3 + d \times x_4$, respectively. Thus, for example, if one of signals $x_1$ and $x_2$ is zero during each symbol, then symbol decoder 850₁ will receive either $a \times x_1$ or $b \times x_2$. Similarly, if one of signals $x_3$ and $x_4$ is zero during each symbol, then symbol decoder 850₂ will receive either $c \times x_3$ or $d \times x_4$.

The above example clearly illustrates that the effect of the postcoder matrix P can be such that: (i) crosstalk between subscribers in different groups 210 is mitigated to a substantial extent and (ii) for each group 210, a sum of data signals from all CPE units 150 of the group is conveyed to a symbol decoder associated with the group.

Under appropriate indexing of the CPE units 150ᵢ of different groups 210_g, the task of generating the postcoder matrix P corresponds to the mathematical problem of finding a G×N transformer matrix that transforms the channel matrix H into a corresponding block-diagonal matrix R. A person of ordinary skill in the art will understand that many block-diagonalization techniques suitable for solving this mathematical problem are known in the field of linear algebra. As such, in different embodiments, step 1006 may be implemented using different ones of such techniques.

In some embodiments, the algorithm for generating the postcoder matrix P at step 1006 of method 1000 can be based on the following optimization algorithm.

The algorithm is generally directed at maximizing the quantity $Q_g(w,p)$ expressed by Eq. (8), for each group indexed by g:

$$Q_g(w, p) = \sum_k \sum_{n \in G_g} \log_2\left(1 + \frac{|[P_k]_{g,:}[H_k]_{:,n}|^2 p_k^n}{\Gamma \sum_{j=1}^N |[P_k]_{g,j}|^2 \sigma_k^j}\right) \quad (8)$$

where $[P_k] = W^*_{k,g} \hat{P}_{G(g)}^k$ is the 1×N postcoder for group g on tone k, formed by a linear combination of the rows of the matrix $\hat{P}_{F(g)}^k$ which is the submatrix of the N×N postcoder matrix $\hat{P}_k$ obtained by extracting the rows corresponding to the group g. The maximization of $Q_g(w,p)$ can be performed under the following constraints:

$$\forall n \in G_g : \sum_k p_k^n \leq ATP_n \quad (9)$$

$$\forall n \in G_g, \forall k : p_k^n \leq 0_k^{mask,n} \quad (10)$$

$$\forall n \notin G_g, \forall k : [P_k H_k]_{g,n} = 0 \quad (11)$$

Constraints (9), (10), and (11) can be referred to as the ATP constraint, the mask constraint, and the block-diagonalization constraint, respectively. The various quantities used in Eqs. (8)-(11) are defined as follows:

$H_k$ N×N channel matrix corresponding to the k-th tone;
$[H_k]_{:,n}$ n-th column of the matrix $H_k$;
$G_g$ set of CPE units 150 in group 210_g;
$N_g$ number of CPE units 150 in the set $G_g$;
$\hat{P}_k$ N×N postcoder matrix for the k-th tone;
$[P_k]_{g,:}$ 1×N postcoder matrix for the group g on tone k, to be stored for subsequent use in vector processor 844;
$w_{k,g}$ $N_g \times 1$ vector of complex weights;
$\Gamma$ SNR gap;
$\sigma_k^n$ noise on the k-th tone of subscriber line 140_n at CPE unit 138_n;
$ATP_n$ aggregate uplink transmit-power constraint corresponding to the n-th subscriber;
$\sigma_k^{mask,n}$ PSD-mask constraint for the n-th subscriber on the k-th tone;
$P_k^n$ allocated transmit power for the n-th subscriber on the k-th tone
w collection of weights $w_{k,g}$ over all tones k and groups g; and
p collection of powers $p_k^n$ over all tones k and groups g.

In an example embodiment, the above-defined algorithm can be implemented using the following generalized processing sub-steps:
 (i) reading from the memory the full N×N channel matrix H estimated at step 1002;
 (ii) generating the N×N postcoder matrix $\hat{P}_k$ by inverting the full N×N channel matrix H (or a normalized version thereof);
 (iii) for each group g, extracting the sub-matrix $\hat{P}_{G(g),:}^k$ consisting of the $N_g$ rows of $\hat{P}_k$ associated with subscribers in group g;
 (iv) for each group g, optionally, replacing $\hat{P}_{G(g),:}^k$ with $N_g$ mutually orthogonal rows obtained by applying the Gram-Schmidt orthogonalization procedure to $\hat{P}_{G(g),:}^k$;
 (v) for each group g, forming a 1×N row vector via the linear combination $[P_k]_{g,:} = w^*_{G(g),:}^k$, where $w_{k,g}$ is a selected $N_g \times 1$ vector of complex weights;
 (vi) generating the G×N postcoder matrix $P_k$ by stacking the row vectors $[P_k]_{g,:}$ obtained for each group; and
 (vii) configuring CPE unit 150 of the n-th subscriber to transmit with the PSD level of $p_k^n$ on tone k.

In different embodiments, different suitable algorithms can be used to determine the weight vectors $w_{k,g}$ and the transmit PSD levels $p_k^n$ in the corresponding sub-step(s) of step 1006. For illustration purposes and without any implied limitations, two examples of such suitable algorithms are provided below. A person of ordinary skill in the pertinent art will understand that other suitable algorithms may alternatively be used.

Sub-Step 1006-A

Determine PSD levels $p_k^n$ using waterfilling, as follows. Define $$p_k^n(\tau_n) = \min\left(\max\left(\tau_n - \frac{\Gamma \sigma_k^n}{|[H_k]_{n,n}|^2}, 0\right), \sigma_k^{mask,n}\right)$$

and, for each n, choose the maximum $\tau_n$ such that $$\sum_k p_k^n(\tau_n) \leq ATP_n.$$

Then choose weight vectors $w_{k,g}$ to be vectors of length $N_g$ with every element equal to unity.

Sub-Step 1006-B

Choose initial weights w[0] and PSD levels $p_k^n[0]$ using sub-step 1006-A, e.g., as explained above. Then, for each group g, using iterative constrained optimization methods (such as, gradient ascent, iterative convex approximation, trust region methods, etc.) known to those skilled in the pertinent art, find a sequence of improved weights $w_{k,g}[1]$, $w_{k,g}[2]$, ..., and improved PSD levels $p_k^n[1]$, $p_k^n[2]$, ..., for n∈$G_g$, that converge to a local maximum of the objective $Q_g(w,p)$ in Eq. (8), subject to the constraints given by Eqs. (9), (10), and (11). In this optimization, there are $N_gK$ complex optimization variables (the $N_g$ elements of $w_{k,g}$, for each of K tones), and $N_gK$ non-negative real optimization variables (the values of $p_k^n$).

In some embodiments, the PSD levels $p_k^n$ may not be under the control of DPU 110. In such embodiments, the optimization of sub-step 1006-B can be carried out only over the weights w.

At step 1008, receiver 800 is configured to begin the signal processing corresponding to a selected symbol period.

At step 1010, receiver 800 operates to receive and demodulate input signals $802_1$-$802_N$, thereby recovering N DMT symbols corresponding to the selected symbol period. The recovered symbols are then outputted as data blocks $842_1$-$842_N$. The circuits used at step 1010 are AFE 808, DFE 818, and demodulators $840_1$-$840_N$.

At step 1012, a resource block is selected for which the next round of signal-processing operations is to be performed.

At step 1014, data blocks $842_1$-$842_N$ are processed to extract therefrom the N data sub-blocks corresponding to the resource block selected at step 1012. Vector processor 844 then operates to apply the postcoder matrix P computed at step 1006 to the extracted data sub-blocks to generate the corresponding subset of data blocks $846_1$-$846_G$. Said subset of data blocks $846_1$-$846_G$ may temporarily be stored in a buffer to allow for additional resource blocks (if any) to be processed.

Step 1016 serves to determine whether or not the processing of all resource blocks corresponding to the selected symbol period is completed. If yes, then the processing of method 1000 is directed to step 1018. Otherwise, the processing of method 1000 is directed back to step 1012 where another resource block can be selected for processing.

At step 1018, processor 830 operates to advance the signal processing through the signal-decoding, deframing, and decapsulation operations. The circuits used at step 1018 are symbol decoders $850_1$-$850_G$, deframers $860_1$-$860_G$, and decapsulation modules $870_1$-$870_N$. As a result, the corresponding respective portions of output data signals $872_1$-$872_N$ are generated.

Step 1020 serves to determine whether or not the input signals $802_1$-$802_N$ received in another symbol period need to be processed. If yes, then the processing of method 1000 is directed back to step 1008 where the processing corresponding to said another symbol period can begin. Otherwise, the processing of method 1000 is terminated.

FIG. 11 shows a flowchart of a scheduling method 1100 that can be used in system 100 (FIG. 1) according to an embodiment. In an example embodiment, method 1100 can be implemented using (i) one or more of schedulers 580, 680, 880, and 980 and (ii) other appropriate circuitry, such as a system controller.

At step 1102 of method 1100, the relevant scheduler receives/obtains information regarding: (i) the number G and (ii) the assignment of specific CPE units 150 to different groups 210. This information is generally available from the memory associated with step 704 of method 700 and/or step 1004 of method 1000.

At step 1104, the relevant scheduler may receive/obtain other information that may be relevant to determining the schedule at step 1106. Such other information may include one or more of the following:
  (i) service level agreements indicating data rates and service quality for different subscribers;
  (ii) traffic information indicating the service that the subscriber may have received in the past;
  (iii) predetermined activity ratios, which may dictate the fraction of symbol periods and/or resource blocks that each subscriber may be able to use, etc.

At step 1106, the relevant scheduler uses the information of steps 1102 and 1104 to decide which subscriber will be allocated to each resource block in one or more future symbol periods. This decision is made under the above-indicated constraints that no more than one subscriber from each group 210 can be allocated the same resource block during a given symbol period.

At step 1108, the relevant scheduler communicates the schedule generated at step 1106 or some relevant parameters thereof to different pertinent circuits. As already indicated above, such circuits may include encapsulation modules $520_1$-$520_N$, framers $630_1$-$630_N$, symbol encoders $640_1$-$640_N$, symbol decoders $950_1$-$950_N$, deframers $960_1$-$960_N$, decapsulation modules $870_1$-$870_N$, and CPE controllers 380 and 480.

FIGS. 12A-12C graphically illustrate resource-block allocation schemes that can be used in various embodiments. More specifically, FIGS. 12A-12C provide non-limiting examples of the allocation of resource blocks to subscribers using different multiple-access schemes. In each of FIGS. 12A-12C, the frequency resources (e.g. subcarriers) are depicted using the vertical axis, and the time resources (e.g. symbols) are depicted using the horizontal axis.

FIG. 12A illustrates an FDMA schedule, in which frequency resources of a given symbol are divided into resource blocks and assigned to different subscribers. The resulting division and assignment are fixed and used for a sequence of symbols, e.g., until a new FDMA schedule is applied. In the shown non-limiting example, four resource blocks in each symbol are allocated among three subscribers, as indicated in FIG. 12A.

FIG. 12B illustrates a TDMA schedule, in which the whole symbol is considered to be a single resource block.

Different symbols are allocated to different subscribers. A group of symbols can typically be organized into a frame. The symbols of each subsequent frame can typically be assigned to subscribers using the same temporal pattern as that of the first frame, e.g., until a new TDMA schedule is applied. In the shown non-limiting example, a frame having three symbols is illustrated, wherein one respective symbol is allocated to each of three subscribers.

FIG. 12C illustrates a T/FDMA schedule according to an example embodiment. In an example T/FDMA schedule, frequency resources are divided into resource blocks, and a number of consecutive symbols are organized into a frame. The allocations of resource blocks to subscribers can vary from symbol to symbol within a frame, e.g., in any suitable or arbitrary manner. The spectral and temporal allocation patterns can typically be repeated in each subsequent frame, e.g., until a new T/FDMA schedule is applied. In the shown non-limiting example, a frame having three symbols is illustrated. The total of twelve resource blocks are allocated to three subscribers, with the first, second, and third subscribers having been allocated four, three, and five resource blocks, respectively, using the indicated spectral/temporal pattern.

A person of ordinary skill in the art will understand that, in some specific implementations, the T/FDMA schedule illustrated in FIG. 12C can resemble and/or be analogous to the FDMA schedule illustrated in FIG. 12A. In some other specific implementations, the T/FDMA schedule illustrated in FIG. 12C can resemble and/or be analogous to the TDMA schedule illustrated in FIG. 12B.

Within the framework of G.fast, discontinuous operation can be used to reduce power consumption by switching at least some lines ON and OFF (e.g., quiet or idle) on a relatively short time scale. However, implementing such discontinuous operation in combination with precoding and/or postcoding typically requires that good precoding/postcoding performance be maintained on the active lines while the other lines are temporarily discontinued (e.g., quiet or idle). Some embodiments disclosed herein can be used to address this problem, e.g., as described in more detail below in reference to FIGS. 13A-13B.

Figure 13A:
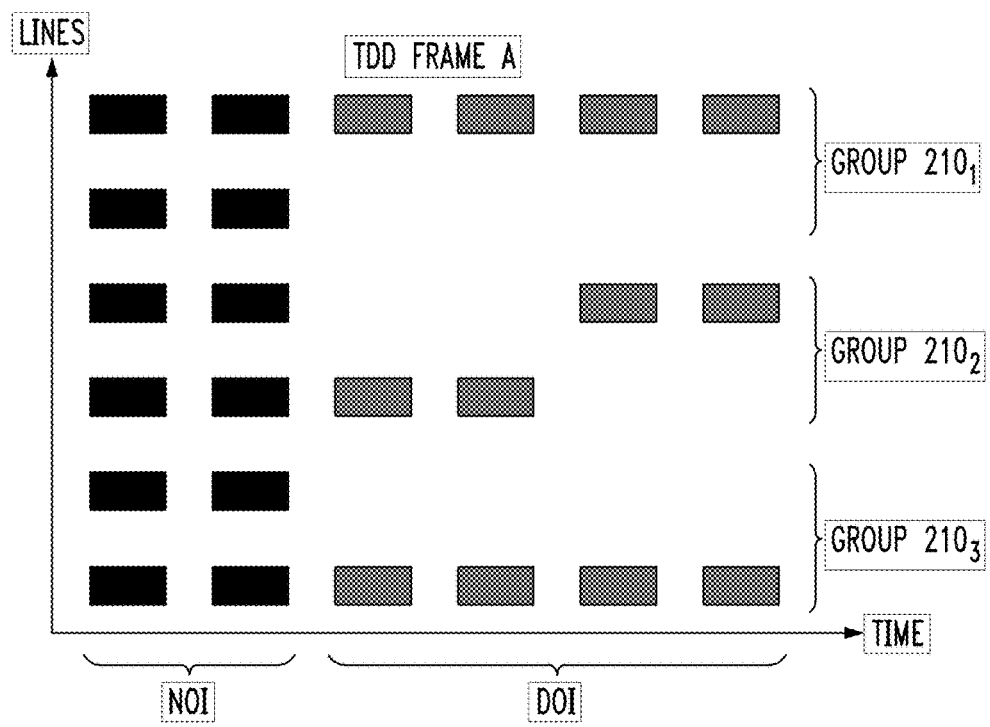
FIGS. 13A-13B graphically show a TDMA schedule that can be used in the communication system of FIG. 1 according to an embodiment.
Figure 13B:
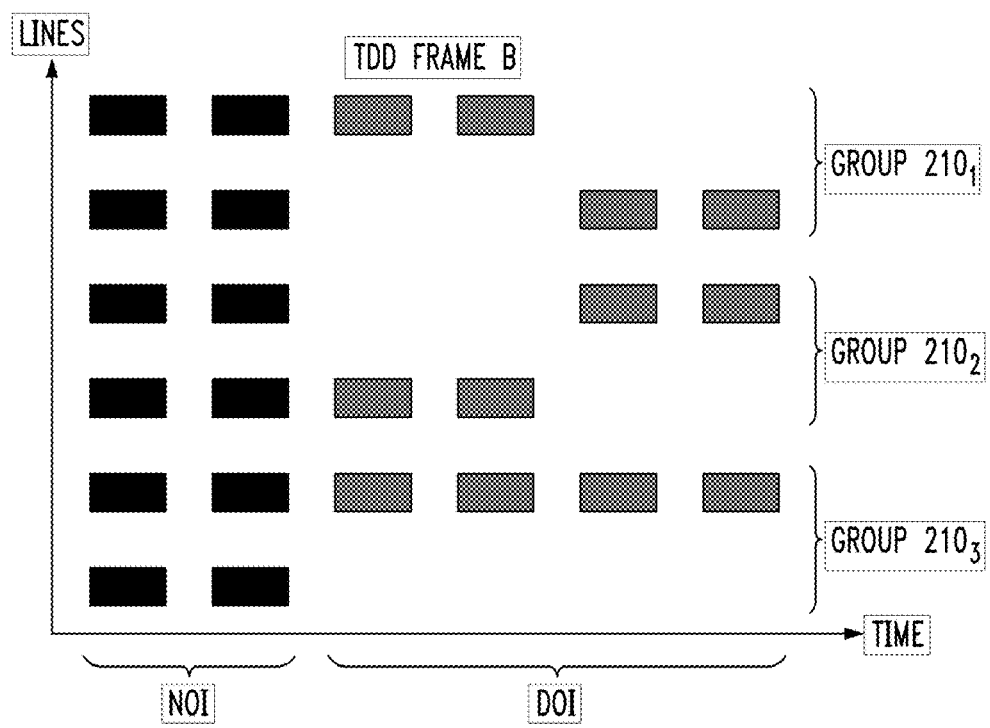

FIGS. 13A-13B graphically show a TDMA schedule that can be used in system 100 according to an embodiment. More specifically, FIGS. 13A-13B represent two different dynamic-resource-allocation (DRA) configurations that can be used in system 100 without changing the definitions of groups 210. During the normal-operation interval (NOI), more than one subscriber can be active in each group 210. However, during the discontinuous-operation interval (DOI), schedulers 580, 680, 880, and/or 980 are used to limit the data-transmission activity to one subscriber per group 210 at a time. Note that different patterns of DOI subscriber activity can be implemented for different frames, as evidenced by the comparison of Frame A and Frame B shown in FIGS. 13A and 13B, respectively.

Since the group definitions remain the same, there is no need for re-computing the precoder matrix P or the postcoder matrix P in system 100 for the transmissions corresponding to this TDMA schedule. As a result, fast DRA re-configurations for different DOIs are possible while good precoding/postcoding performance is maintained on the active lines 140.

It should also be noted that, when more than one subscriber is active in a group 210 (e.g., as during the NOI), only that group 210 is impacted in performance. This characteristic of system 100 can be viewed as representing the reduced effective overall contention between subscribers. In contrast, the system performance under conventional DOI vectoring schemes may disadvantageously be affected by a much higher contention probability because such contention probability additionally includes situations in which subscribers from different putative groups are active.

Various embodiments disclosed herein may provide one or more of the following technical benefits and/or advantages.

One beneficial effect is that at least some embodiments can be used to reduce the complexity (and therefore the cost) of the DPU hardware compared to that associated with some conventional vectoring solutions. For example, a vector processor 544 or 844 can operate using an N×G precoder matrix P or a G×N postcoder matrix P, as opposed to the N×N matrices that are conventionally required. A person of ordinary skill in the art will understand that the size of the matrix P is typically directly related to the size and complexity of the corresponding vector processor.

Furthermore, in some embodiments, the DPU's DSP can be implemented using a reduced number of circuit elements. For example, transmitter 500 can be implemented using only G (as opposed to N) framers 530 and only G (as opposed to N) symbol encoders 540. Receiver 800 can be implemented using only G (as opposed to N) deframers 860 and only G (as opposed to N) symbol decoders 850.

At least some embodiments also have technical advantages over an alternative vectoring scheme that employs a reduced-size vector processor based on G×G precoder or postcoder matrices. Such a scheme can be used to cancel crosstalk only between the active subscribers for each resource block in the schedule. However, in this case, significant additional complexity and/or relatively large latency may have to be tolerated to have the capability for re-computing vectoring matrices and storing/loading the recomputed matrices whenever the schedule changes. In contrast, in the disclosed embodiments, the matrices P do not need to be changed when the schedule changes.

At least some embodiments may have technical advantages over an alternative vectoring scheme based on an N×G precoder that is constructed by selecting G columns from an N×N precoder corresponding to the active subscribers in each resource block. In this case significant additional complexity and/or relatively large latency may have to be tolerated to have the capability for storing/loading the modified vectoring matrices whenever the schedule changes. In contrast, in the disclosed embodiments, the matrices P do not need to be changed when the schedule changes.

At least some embodiments are suitable for supporting TDMA and/or T/FDMA schemes, e.g., because the matrices P do not need to be changed when the schedule changes. In contrast, at least some conventional schemes may disadvantageously require that the matrices P be changed on a symbol-by-symbol basis.

At least some embodiments are also suitable for supporting FDMA schemes in which the FDMA schedule may need to be changed frequently, e.g., in response to dynamically changing traffic demands.

According to an example embodiment disclosed above, e.g., in the summary section and/or in reference to any one or any combination of some or all of FIGS. 1-13, provided is an apparatus comprising: a data transmitter (e.g., 110, FIG. 1) that comprises an analog front end (e.g., 568, FIG. 5) connectable to proximal ends of a plurality of subscriber lines (e.g., 140, FIG. 1) and a digital signal processor (e.g., 510, FIG. 5) configured to process digital samples corresponding to a plurality of distinct groups of output signals and to drive the analog front end to cause the plurality (e.g., G, FIG. 2) of distinct groups of output signals (e.g., corresponding to $210_1$ and $210_2$, FIG. 5) to be transmitted on the subscriber lines using frequency-division multiplexing, with each of the distinct groups of the output signals being transmitted on a corresponding distinct group of the subscriber lines, at least one of the distinct groups of the subscriber lines including at least two of the subscriber lines; wherein the digital signal processor comprises a vector processor (e.g., 544, FIG. 5) configured to precode (e.g., using the matrix P, Eq. (1)) the digital samples in a manner that causes effects of crosstalk between the distinct groups of the subscriber lines to be substantially (e.g., in the sense explained in reference to the matrix R, Eq. (1)) mitigated at distal ends of the plurality of subscriber lines; and wherein the vector processor is further configured to precode the digital samples in a manner that causes each of the distinct groups of the output signals to convey a different respective data block (e.g., $542_1$ and $542_2$, respectively, FIG. 5) to the distal ends of the corresponding distinct group of the subscriber lines, said different respective data block being conveyed to each of the distal ends of the corresponding distinct group of the subscriber lines.

In some embodiments of the above apparatus, the vector processor is configured to precode the output signals using a fixed precoder matrix during two or more symbol periods during which a tone corresponding to said fixed precoder matrix is allocated to different respective subscribers.

In some embodiments of any of the above apparatus, the vector processor has G inputs and N outputs, where the number G is the number of the distinct groups, and the number N is the number of the subscriber lines, the number N being greater than the number G, the number G being greater than one; wherein each of the N outputs is connected to a respective one of the subscriber lines; and wherein the G inputs are connected to N different data sources (e.g., $502_1$-$502_N$; FIG. 5).

In some embodiments of any of the above apparatus, the digital signal processor further comprises G multiplexers (e.g., 524, FIG. 5; 644, FIG. 6), each connected to transmit data to a respective one of the G inputs in response to data received from a respective subset of the N different data sources.

In some embodiments of any of the above apparatus, the apparatus further comprises a scheduler (e.g., 580, FIG. 5; 680, FIG. 6) configured to control flows of data (e.g., using 1100, FIG. 11) to the G inputs of the vector processor such that exactly one of the data sources from each respective subset is connected to provide data to a corresponding one of the G inputs for being transmitted using a given resource block during a given symbol period.

In some embodiments of any of the above apparatus, the vector processor is configured to precode the output signals using a N×G precoder matrix (e.g., P, Eq. (1)).

In some embodiments of any of the above apparatus, the precoder matrix is frequency dependent.

In some embodiments of any of the above apparatus, the data transmitter is configured to compute the N×G precoder matrix (e.g., at 706, FIG. 7) in response to measurements of an N×N downlink channel matrix corresponding to the N subscriber lines.

In some embodiments of any of the above apparatus, the apparatus further comprises a scheduler (e.g., 580, FIG. 5; 680, FIG. 6) configured to control flows of data (e.g., using 1100, FIG. 11) through the digital signal processor such that, during a given symbol period, a given resource block of any of the distinct groups of the output signals carries data corresponding to a single respective subscriber.

In some embodiments of any of the above apparatus, the scheduler is configured to control said flows of data using one or both of time-division multiple access and frequency-division multiple access (e.g., as illustrated in FIGS. 12-13).

In some embodiments of any of the above apparatus, the vector processor is configured to precode the output signals using a precoder matrix that is fixed during two or more different time or frequency allocation patterns (e.g., illustrated in FIGS. 12-13) implemented using the scheduler.

In some embodiments of any of the above apparatus, the digital signal processor further comprises a plurality of encapsulation modules (e.g., 520, FIG. 5), a plurality of framers (e.g., 530, FIG. 5), a plurality of symbol encoders (e.g., 540, FIG. 5), and a plurality of modulators (e.g., 550, FIG. 5) connected to the vector processor.

In some embodiments of any of the above apparatus, the digital signal processor further comprises a multiplexer (e.g., 524, FIG. 5) configured to multiplex outputs of at least two of the encapsulation modules.

In some embodiments of any of the above apparatus, the digital signal processor further comprises a multiplexer (e.g., 644, FIG. 6) configured to multiplex outputs of at least two of the symbol encoders.

According to another example embodiment disclosed above, e.g., in the summary section and/or in reference to any one or any combination of some or all of FIGS. 1-13, provided is an apparatus comprising: a data receiver (e.g., 110, FIG. 1) that comprises an analog front end (e.g., 808, FIG. 8) and a digital signal processor (e.g., 830, FIG. 8) configured to process digital samples corresponding to a plurality of input signals received by the analog front end at input ports connectable to proximal ends of a corresponding plurality of subscriber lines (e.g., 140, FIG. 1), the input signals being received in response to data signals applied to distal ends of the subscriber lines, the data signals having been encoded with data using frequency-division multiplexing; wherein the digital signal processor comprises a vector processor (e.g., 844, FIG. 8) configured to postcode (e.g., using the matrix P, Eq. (6)) the digital samples in a manner that causes effects of crosstalk between distinct groups of the subscriber lines to be substantially (e.g., in the sense explained in reference to the matrix $R_u$, Eq. (7)) mitigated, at least one of said distinct groups including at least two of the subscriber lines; and wherein the vector processor is further configured to postcode the digital samples in a manner that causes each distinct group of the data signals to convey the data thereof to a different respective data block (e.g., $846_1$ and $846_2$, respectively, FIG. 8) formed by the vector processor, each of said distinct groups of the data signals being applied to the distal ends of a corresponding one of said distinct groups of the subscriber lines.

In some embodiments of the above apparatus, the vector processor is configured to postcode the digital samples using a fixed postcoder matrix during two or more symbol periods during which a tone corresponding to said fixed postcoder matrix is allocated to different respective subscribers.

In some embodiments of any of the above apparatus, the vector processor has N inputs and G outputs, where the number G is the number of the distinct groups, and the number N is the number of the subscriber lines, the number N being greater than the number G, the number G being greater than one; wherein each of the N inputs is connected to a respective one of the subscriber lines; and wherein the G outputs are connected to G different output data paths (e.g., corresponding to $846_1$-$846_2$; FIG. 8).

In some embodiments of any of the above apparatus, the digital signal processor further comprises G demultiplexers (e.g., 864, FIG. 8; 948, FIG. 9), each connected to transmit data received from a respective one of the G outputs to a respective set of N different data sinks (e.g., 872$_1$-872$_N$; FIG. 8).

In some embodiments of any of the above apparatus, the apparatus further comprises a scheduler (e.g., 880, FIG. 8; 980, FIG. 6) configured to control flows of data (e.g., using 1100, FIG. 11) from the G outputs to the N different data sinks such that exactly one of the data sinks receives data conveyed by the respective group of the input signals using a given resource block during a given symbol period.

In some embodiments of any of the above apparatus, the vector processor is configured to postcode the digital samples using an G×N postcoder matrix (e.g., P, Eq. (6)).

In some embodiments of any of the above apparatus, the postcoder matrix is frequency dependent.

In some embodiments of any of the above apparatus, the data receiver is configured to compute the G×N postcoder matrix (e.g., at 1006, FIG. 10) in response to measurements of an N×N uplink channel matrix corresponding to the N subscriber lines.

In some embodiments of any of the above apparatus, the digital signal processor further comprises a plurality of decapsulation modules (e.g., 870, FIG. 8), a plurality of deframers (e.g., 860, FIG. 8), a plurality of symbol decoders (e.g., 850, FIG. 8), and a plurality of demodulators (e.g., 840, FIG. 5) connected to the vector processor.

In some embodiments of any of the above apparatus, the digital signal processor further comprises a demultiplexer (e.g., 860, FIG. 8) configured to feed at least two of the decapsulation modules in response to a received input.

In some embodiments of any of the above apparatus, the digital signal processor further comprises a demultiplexer (e.g., 948, FIG. 9) configured to feed at least two of the symbol decoders in response to a received input.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As used herein and in the claims, the term "provide" with respect to a system, device, or component encompasses designing or fabricating the system, device, or component; causing the system, device, or component to be designed or fabricated; and/or obtaining the system, device, or component by purchase, lease, rental, or other contractual arrangement.

What is claimed is:

1. An apparatus comprising a data transmitter that comprises an analog front end connectable to proximal ends of a plurality of subscriber lines and a digital signal processor configured to process digital samples corresponding to a plurality of distinct groups of output signals and to drive the analog front end to cause the plurality of distinct groups of output signals to be transmitted on the subscriber lines using frequency-division multiplexing, with each of the distinct groups of the output signals being transmitted on a corresponding distinct group of the subscriber lines, at least one of the distinct groups of the subscriber lines including at least two of the subscriber lines;

wherein the digital signal processor comprises a vector processor configured to precode the digital samples in a manner that causes effects of crosstalk between the distinct groups of the subscriber lines to be substantially mitigated at distal ends of the plurality of subscriber lines;

wherein the vector processor is further configured to precode the digital samples in a manner that causes each of the distinct groups of the output signals to convey a different respective data block to the distal ends of the corresponding distinct group of the subscriber lines, said different respective data block being conveyed to each of the distal ends of the corresponding distinct group of the subscriber lines; and wherein the apparatus further comprises a scheduler configured to control flows of data through the digital signal processor such that, during a given symbol period, a given resource block of any of the distinct groups of the output signals carries data corresponding to a single respective subscriber.

2. The apparatus of claim 1, wherein the vector processor is configured to precode the output signals using a fixed precoder matrix during two or more symbol periods during which a tone is allocated to different respective subscribers.

3. The apparatus of claim 1,
wherein the vector processor has G inputs and N outputs, where the number G is the number of the distinct groups, and the number N is the number of the subscriber lines, the number N being greater than the number G, the number G being greater than one;
wherein each of the N outputs is connected to a respective one of the subscriber lines; and
wherein the G inputs are connected to N different data sources.

4. The apparatus of claim 3, wherein the digital signal processor further comprises G multiplexers, each connected to transmit data to a respective one of the G inputs in response to data received from a respective subset of the N different data sources.

5. The apparatus of claim 3,
wherein the vector processor is configured to precode the output signals using a N×G precoder matrix; and
wherein the data transmitter is configured to compute the N×G precoder matrix in response to measurements of an N×N downlink channel matrix corresponding to the N subscriber lines.

6. The apparatus of claim 1, wherein the scheduler is configured to control said flows of data using one or both of time-division multiple access and frequency-division multiple access.

7. The apparatus of claim 1, wherein the vector processor is configured to precode the output signals using a precoder matrix that is fixed during two or more different time or frequency allocation patterns implemented using the scheduler.

8. The apparatus of claim 1, wherein the digital signal processor further comprises a plurality of encapsulation modules, a plurality of framers, a plurality of symbol encoders, and a plurality of modulators connected to the vector processor.

9. The apparatus of claim 8, wherein the digital signal processor further comprises a multiplexer configured to multiplex outputs of at least two of the encapsulation modules.

10. The apparatus of claim 8, wherein the digital signal processor further comprises a multiplexer configured to multiplex outputs of at least two of the symbol encoders.

11. An apparatus comprising a data receiver that comprises an analog front end and a digital signal processor configured to process digital samples corresponding to a plurality of input signals received by the analog front end at input ports connectable to proximal ends of a corresponding plurality of subscriber lines, the input signals being received in response to data signals applied to distal ends of the subscriber lines, the data signals having been encoded with data using frequency-division multiplexing;

wherein the digital signal processor comprises a vector processor configured to postcode the digital samples in a manner that causes effects of crosstalk between distinct groups of the subscriber lines to be substantially mitigated, at least one of said distinct groups including at least two of the subscriber lines;

wherein the vector processor is further configured to postcode the digital samples in a manner that causes each distinct group of the data signals to convey the data thereof to a different respective data block formed by the vector processor, each of said distinct groups of the data signals being applied to the distal ends of a corresponding one of said distinct groups of the subscriber lines; and wherein the apparatus further comprises a scheduler configured to control flows of data through the digital signal processor such that, during a given symbol period, a given resource block of any of the distinct groups of the data signals carries data corresponding to a single respective subscriber.

12. The apparatus of claim 11, wherein the vector processor is configured to postcode the digital samples using a fixed postcoder matrix during two or more symbol periods during which a tone is allocated to different respective subscribers.

13. The apparatus of claim 11, wherein the vector processor has N inputs and G outputs, where the number G is the number of the distinct groups, and the number N is the number of the subscriber lines, the number N being greater than the number G, the number G being greater than one;

wherein each of the N inputs is connected to a respective one of the subscriber lines; and wherein the G outputs are connected to G different output data paths.

14. The apparatus of claim 13, wherein the digital signal processor further comprises G demultiplexers, each connected to transmit data received from a respective one of the G outputs to a respective set of N different data sinks.

15. The apparatus of claim 13, wherein the vector processor is configured to postcode the digital samples using a G×N postcoder matrix; and wherein the data receiver is configured to compute the G×N postcoder matrix in response to measurements of an N×N uplink channel matrix corresponding to the N subscriber lines.

16. The apparatus of claim 11, wherein the digital signal processor further comprises a plurality of decapsulation modules, a plurality of deframers, a plurality of symbol decoders, and a plurality of demodulators connected to the vector processor.

17. The apparatus of claim 16, wherein the digital signal processor further comprises a demultiplexer configured to feed at least two of the decapsulation modules in response to a received input.

18. The apparatus of claim 16, wherein the digital signal processor further comprises a demultiplexer configured to feed at least two of the symbol decoders in response to a received input.

* * * * *